(12) United States Patent
Gelbart et al.

(10) Patent No.: US 9,504,095 B2
(45) Date of Patent: Nov. 22, 2016

(54) METHODS AND DEVICES FOR APPLYING RF ENERGY ACCORDING TO ENERGY APPLICATION SCHEDULES

(71) Applicant: GOJI LIMITED, Hamilton (BM)

(72) Inventors: Eliezer Gelbart, Holon (IL); Itzhak Chaimov, Mazkeret-Batya (IL); Lior Darshan, Rishon Le Tsiyon (IL)

(73) Assignee: GOJI LIMITED, Hamilton (BM)

( * ) Notice: Subject to any disclaimer, the term of this patent is extended or adjusted under 35 U.S.C. 154(b) by 0 days.

(21) Appl. No.: 14/844,261

(22) Filed: Sep. 3, 2015

(65) Prior Publication Data
US 2015/0382400 A1 Dec. 31, 2015

Related U.S. Application Data

(63) Continuation of application No. 13/759,166, filed on Feb. 5, 2013, now Pat. No. 9,161,390.

(60) Provisional application No. 61/595,413, filed on Feb. 6, 2012, provisional application No. 61/595,399, filed on Feb. 6, 2012.

(51) Int. Cl.
*H05B 1/02* (2006.01)
*H05B 6/00* (2006.01)
(Continued)

(52) U.S. Cl.
CPC ........ *H05B 1/02* (2013.01); *H05B 6/00* (2013.01); *H05B 6/6402* (2013.01); *H05B 6/68* (2013.01); *H05B 6/686* (2013.01); *H05B 6/70* (2013.01); *H05B 6/72* (2013.01); *Y02B 40/143* (2013.01)

(58) Field of Classification Search
CPC .......... H05B 1/02; H05B 6/00; H05B 6/686; H05B 6/70; H05B 40/143; H05B 6/68; H05B 6/6402; H05B 6/72

USPC ................ 219/492, 494, 701, 702, 746, 748
See application file for complete search history.

(56) References Cited

U.S. PATENT DOCUMENTS 2,895,828 A 7/1959 Kamide
4,196,332 A 4/1980 Mackay et al.
(Continued)

FOREIGN PATENT DOCUMENTS

EP 0296527 12/1988
EP 1174667 A1 1/2002
(Continued)

OTHER PUBLICATIONS

Office Action in U.S. Appl. No. 13/759,142, dated Sep. 26, 2014.
(Continued)

*Primary Examiner* — Mark Paschall
(74) *Attorney, Agent, or Firm* — Greenblum & Bernstein, P.L.C.

(57) ABSTRACT

Electromagnetic energy is applied to an object at multiple modulation space elements (MSEs). MSEs are grouped into at least a first subset and a second subset according to a first grouping rule. A first EM energy application protocol is associated with the first subset and a second EM energy application protocol is associated with the second subset. Energy is applied at each of the plurality of MSEs according to the first EM energy application protocol and the second EM energy application protocol. MSEs are grouped into a third subset and a fourth subset according to a second grouping rule. A third EM energy application protocol is associated with the third subset and a fourth EM energy application protocol is associated with the fourth subset. EM energy at each of the plurality of MSEs is applied according to the third EM energy application protocol and the fourth EM energy application protocol.

21 Claims, 10 Drawing Sheets

(51) Int. Cl.
*H05B 6/68* (2006.01)
*H05B 6/70* (2006.01)
*H05B 6/64* (2006.01)
*H05B 6/72* (2006.01)

(56) References Cited

U.S. PATENT DOCUMENTS

| | | | |
|---|---|---|---|
| 4,415,789 | A | 11/1983 | Nobue et al. |
| 4,883,944 | A | 11/1989 | Takano et al. |
| 4,939,331 | A | 7/1990 | Berggren et al. |
| 5,008,506 | A | 4/1991 | Asmussen et al. |
| 6,346,693 | B1 | 2/2002 | Kasevich |
| 6,403,939 | B1 | 6/2002 | Fagrell |
| 6,680,467 | B1 | 1/2004 | Whipple, Jr. |
| 6,720,540 | B2 | 4/2004 | Fagrell |
| 7,994,962 | B1 | 8/2011 | Ben-Shmuel |
| 8,653,482 | B2 | 2/2014 | Ben-Shmuel |
| 8,839,527 | B2 | 9/2014 | Ben-Shmuel et al. |
| 9,040,879 | B2 | 5/2015 | Libman et al. |
| 2002/0157411 | A1 | 10/2002 | Ishikawa et al. |
| 2002/0175163 | A1 | 11/2002 | Fagrell |
| 2004/0173604 | A1 | 9/2004 | Fagrell |
| 2004/0206755 | A1 | 10/2004 | Hadinger |
| 2007/0039949 | A1 | 2/2007 | Wilson |
| 2008/0047948 | A1 | 2/2008 | Rosenbloom et al. |
| 2008/0290087 | A1 | 11/2008 | Ben-Shmuel et al. |
| 2009/0045191 | A1 | 2/2009 | Ben-Shmuel et al. |
| 2009/0057302 | A1 | 3/2009 | Ben-Shmuel et al. |
| 2009/0236334 | A1 | 9/2009 | Ben-Shmuel et al. |
| 2010/0176123 | A1 | 7/2010 | Mihara et al. |
| 2010/0224623 | A1 | 9/2010 | Yasui et al. |
| 2011/0108548 | A1 | 5/2011 | Nobue et al. |
| 2011/0168699 | A1 | 7/2011 | Oomori et al. |
| 2012/0097669 | A1 | 4/2012 | Sim et al. |
| 2012/0312801 | A1* | 12/2012 | Bilchinsky ............ H05B 6/705 219/438 |
| 2013/0080098 | A1 | 3/2013 | Hadad et al. |
| 2013/0087545 | A1 | 4/2013 | Bilchinsky et al. |
| 2013/0146590 | A1 | 6/2013 | Einziger et al. |
| 2013/0200065 | A1 | 8/2013 | Libman et al. |
| 2013/0206749 | A1 | 8/2013 | Libman et al. |
| 2013/0306627 | A1 | 11/2013 | Libman et al. |
| 2013/0334214 | A1 | 12/2013 | Yogev et al. |
| 2014/0247060 | A1 | 9/2014 | Ben Haim et al. |
| 2014/0287100 | A1 | 9/2014 | Libman |

FOREIGN PATENT DOCUMENTS

| | | |
|---|---|---|
| EP | 2051564 A1 | 4/2009 |
| JP | 52-014946 | 2/1977 |
| JP | 1-159388 U1 | 11/1989 |
| JP | 04-259789 | 9/1992 |
| JP | 7-18553 B2 | 3/1995 |
| JP | 10-196966 | 7/1998 |
| JP | 2001-317741 | 11/2001 |
| JP | 2002-280159 | 9/2002 |
| JP | 2002-532239 | 10/2002 |
| JP | 2008-34244 A | 2/2008 |
| JP | 2008-269793 A | 11/2008 |
| JP | 2009-259511 A | 11/2009 |
| WO | 91/07069 A1 | 5/1991 |
| WO | 00/36880 | 6/2000 |
| WO | 02/23953 A1 | 3/2002 |
| WO | 2007/096877 A2 | 8/2007 |
| WO | 2008/007368 | 1/2008 |
| WO | 2009/050893 A1 | 4/2009 |
| WO | 2010/052723 | 5/2010 |
| WO | 2010/052724 | 5/2010 |
| WO | 2011/010799 | 1/2011 |
| WO | 2011/058537 | 5/2011 |
| WO | 2011/058538 | 5/2011 |
| WO | 2012/001523 | 1/2012 |
| WO | 2012/066419 | 5/2012 |
| WO | 2013/003330 | 3/2013 |

OTHER PUBLICATIONS

Notice of Allowance in U.S. Appl. No. 13/759,142, dated Jan. 23, 2015.
Abstract of U.S. 2002/0157411 of Oct. 31, 2002.

* cited by examiner

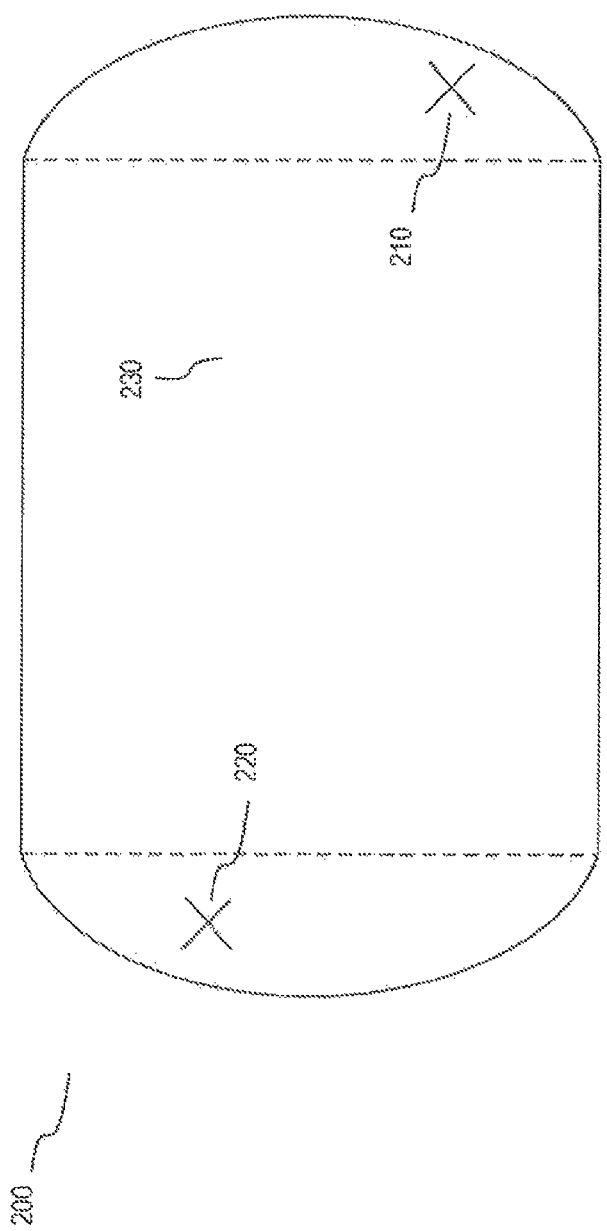

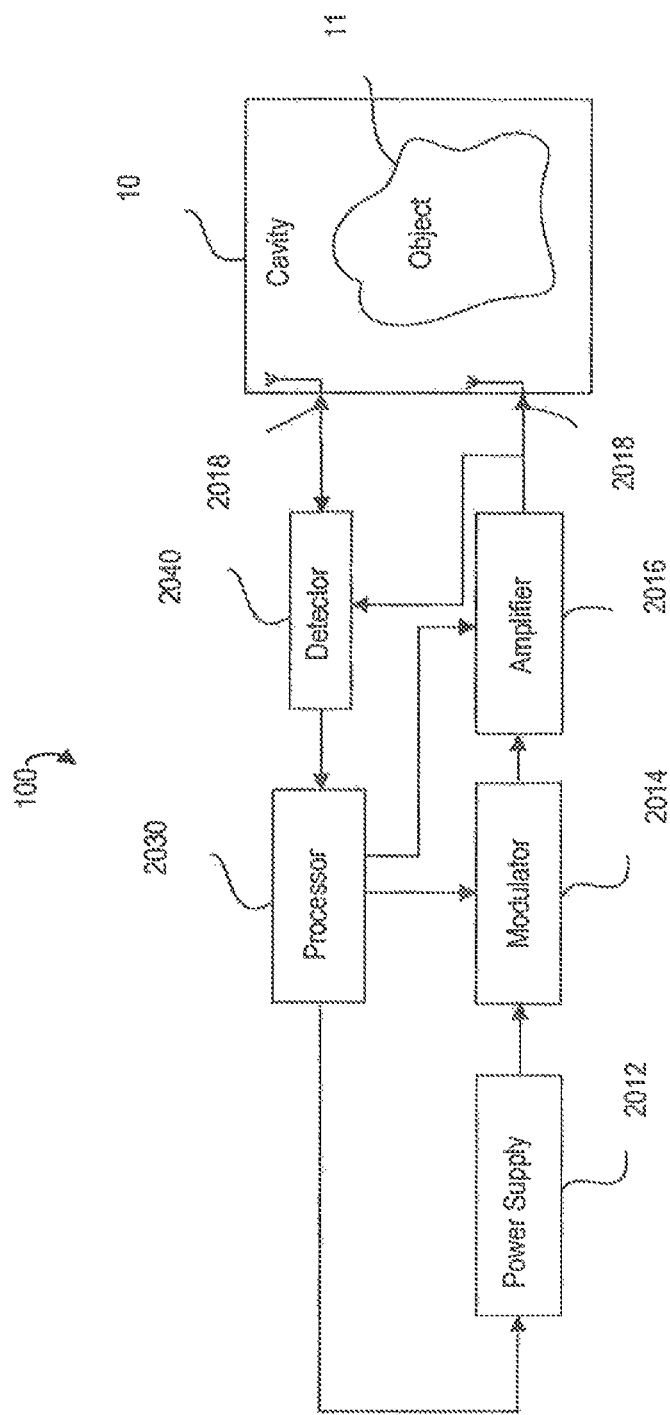

ical Field

This is a U.S. Patent Application relating to a device and method for applying energy from electromagnetic radiation in the radio frequency (RF) range (hereinafter "RF energy") to an energy application zone, and more particularly but not exclusively to such device and method that apply the RF energy for heating an object in the energy application zone.

BACKGROUND

Electromagnetic (EM) waves have been used in various applications to supply energy to objects. In the case of RF radiation for example, EM energy may be supplied using a magnetron, which is typically tuned to a single frequency for supplying EM energy only in that frequency. One example of a commonly used device for supplying EM energy is a microwave oven. Typical microwave ovens supply EM energy at or about a single frequency of 2.45 GHz,

SUMMARY OF A FEW EXEMPLARY ASPECTS OF THE DISCLOSURE

Some exemplary aspects of the disclosure include apparatuses and methods for applying RF energy to an object in an energy application zone and more particularly for applying the RF energy for heating an object in the energy application zone.

Some exemplary aspects of the invention may be directed towards an apparatus for applying EM energy to an object in an energy application zone via at least one radiating element at a plurality of modulation space elements (MSEs), defining adjustable parameters of the apparatus which affect a field pattern in the energy application zone. The apparatus may comprise at least one processor configured to determine an amount of energy to be supplied to the at least one radiating element at each of the plurality of MSEs. The processor may be further configured to determine an energy application schedule, the energy application schedule comprising timing instructions for applying energy at at least a subset of the plurality of MSEs; and cause application of energy according to the determined amounts of energy and the determined energy application schedule.

In some embodiments, the energy application schedule may include instructions to apply energy at an irregular order. Additionally, or alternatively, the energy application schedule may include instructions to intermit energy application between two or more energy application events.

In some embodiments, the processor may be configured to determine the schedule based on feedback received from the energy application zone. The feedback may include EM feedback. In some embodiments, the processor may be configured to group MSEs into MSE groups, and determine the energy application schedule according to the grouping.

In some embodiments, the processor may be further configured to group MSEs into a first MSE group and a second MSE group, and the energy application schedule may further comprise applying no more than a first number of MSEs from the first group before applying MSEs from the second group. In some embodiments, the first number may be one.

In some embodiments, the processor may be configured to group the MSEs into MSE groups based on EM feedback received from the energy application zone. The processor may be further configured to determine the energy application schedule according to the MSE groups. Additionally, or alternatively, the processor may be configured to group MSEs into groups according to values of one or more modulation space variables. Additionally, or alternatively, the processor may be configured to group MSEs into groups according to frequency values of the MSEs. In some embodiments, the energy application schedule may include one or more intermissions between subsequent energy application events, each of the intermissions being shorter by at least 90% from a time duration, at which heat diffuses 1 cm in the object. In some embodiments, the energy application schedule may include instructions to intermit energy application between two or more energy application events for a period of 1 second or less. In some embodiments, one or more of the intermissions may be shorter than a typical energy application event.

In some embodiments, the apparatus may further include an interface configured to receive data. In some such embodiments the processor may be further configured to determine the energy application schedule based on the data. In some embodiments, the interface may be configured to receive the data from outside the energy application zone. In some embodiments, the interface may include a user interface. In some embodiments, the interface may include a connection to a communication network, for example, an Internet connection. In some embodiments, the interface may include a reader for a machine readable element. For example, the machine readable element may include a barcode and/or an RFID tag.

Exemplary aspects of the invention may be directed towards a method of applying EM energy to an object in an energy application zone via at least one radiating element at a plurality of MSEs. The method may comprise determining an amount of EM energy to be supplied to the radiating elements at the plurality of MSEs, determining an energy application schedule comprising timing instructions for applying energy at at least a subset of the plurality of MSEs. The method may further comprise causing application of EM energy according to the determined amounts of energy and the determined energy application schedule.

The energy application schedule may further comprise instructions to apply the EM energy at an irregular order. The energy application schedule may further comprise instructions to intermit energy application between two or more energy application events. The method may further comprise determining the energy application schedule based on feedback received from the energy application zone. The feedback may further comprise EM feedback. The method may further comprise grouping MSEs into MSE groups and determining the energy application schedule according to the MSE groups. The method may further comprise grouping MSEs into a first MSE group and a second MSE group, and wherein the energy application schedule may further comprise applying no more than a first number of MSEs from the first group before applying MSEs from the second group. Optionally, the first number of MSEs may be one. The method may further comprise grouping MSEs into MSE groups based on EM feedback received from the energy application zone and determining the energy application schedule according to the MSE groups. The grouping of MSEs into groups may be based on values of one or more modulation space variables. The grouping of MSEs into groups may be based on frequency values of the MSEs.

The energy application schedule may further comprise one or more intermissions between energy application events, at least one of the one or more intermissions being shorter by at least 90% from a time duration at which heat diffuses 1 cm in the object. The energy application schedule may further include instructions to intermit energy application between two or more energy application events for a period of 1 second or less.

An average duration of an intermission may be smaller than an average duration of an energy application event. The method may further comprise receiving data via an interface and determining the energy application schedule based on the received data. In some embodiments, the interface may be configured to receive the data from outside the energy application zone. The interface may comprise a user interface. The interface may comprise a connection to a communication network. The interface may comprise an Internet connection. The interface may comprise a reader for a machine readable element. The machine readable element may comprise a barcode or an RFID tag.

Exemplary aspects of the invention may be directed towards a method for applying EM energy to an object at a plurality of MSEs. The method may comprise: (a) grouping a number of the plurality of MSEs into at least a first subset and a second subset according to a first grouping rule, (b) associating a first EM energy application protocol with the first subset and a second EM energy application protocol with the second subset, (c) applying energy at each MSE according to the first and second EM energy application protocols, (d) grouping the number of the plurality of MSEs into a third subset and a fourth subset according to a second grouping rule, and (e) associating a third EM energy application protocol with the third subset and a fourth EM energy application protocol with the fourth subset, and (f) applying the EM energy at each of the plurality of MSEs according to the third and fourth EM energy application protocols. In some embodiments, the method may include associating each MSE with a value of an absorbability indicator. In some embodiment, the at least one of the grouping rules may dictate grouping according to values of the absorbability indicator. In some embodiments, the method may include associating each MSE with a value of an absorbability indicator. In some embodiments, the grouping rules may include threshold values and dictate grouping according to the values of the absorbability indicator in reference to the threshold values. In some embodiments, the rules may differ from one another in the threshold values.

Exemplary aspects of the invention may be directed towards an apparatus for applying EM energy to a load at a plurality of MSEs. The apparatus may comprise at least one processor configured to: (a) group a number of the plurality of MSEs into at least a first subset and a second subset according to a first grouping rule, (b) associate a first EM energy application protocol with the first subset and a second EM energy application protocol with the second subset, (c) cause application of energy at each MSE according to first and second EM energy application protocol, (d) group the number of the plurality of MSEs into a third subset and a fourth subset according to a second grouping rule, and (e) associate a third EM energy application protocol with the third subset and a fourth EM energy application protocol with the fourth subset, and (f) apply the EM energy at each of the plurality of MSEs according to the third and fourth EM energy application protocols.

In some embodiments, the at least one processor may be further configured to associate each MSE with a value of an absorbability indicator. In some embodiments, at least one of the grouping rules dictates grouping according to values of the absorbability indicator. In some embodiments, the at least one processor may be further configured to associate each MSE with a value of an absorbability indicator. In some embodiments, the grouping rules include threshold values and dictate grouping according to the values of the absorbability indicator in reference to the threshold values. In some embodiments, the first and second threshold values may be different.

The drawings and detailed description which follow contain numerous alternative examples consistent with the invention. A summary of every feature disclosed is beyond the object of this summary section. For a more detailed description of exemplary aspects of the invention, reference should be made to the drawings, detailed description, and claims, which are incorporated into this summary by reference.

BRIEF DESCRIPTION OF THE DRAWINGS

FIG. 2B is a view of a cavity, in accordance with some exemplary embodiments of the present invention;

FIG. 3A is a diagrammatic representation of an apparatus for applying EM energy to an object, in accordance with some exemplary embodiments of the present invention;

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

In one respect, the invention may involve apparatus and methods for applying EM energy. The term EM energy, as used herein, includes energy deliverable by EM radiation in all or portions of the EM spectrum, including but not limited to, radio frequency (RF), infrared (IR), near infrared, visible light, ultraviolet, etc. In one particular example, applied EM energy may include RF energy with a wavelength in free space of 100 km to 1 mm, which corresponds to a frequency of 3 KHz to 300 GHz, respectively. In some other examples, the applied EM energy may fall within frequency bands between 500 MHz to 1500 MHz or between 700 MHz to 1200 MHz or between 800 MHz-1 GHz. Applying energy in the RF portion of the EM spectrum is referred herein as applying RF energy. Microwave and ultra high frequency (UHF) energy, for example, are both within the RF range. In some other examples, the applied EM energy may fall only within one or more ISM frequency bands, for example, between 433.05 and 434.79 MHz, between 902 and 928 MHz, between 2400 and 2500 MHz, and/or between 5725 and 5875 MHz. Even though examples of the invention are described herein in connection with the application of RF energy, these descriptions are provided to illustrate a few exemplary principles of the invention, and are not intended to limit the invention to any particular portion of the EM spectrum.

Figure 1:
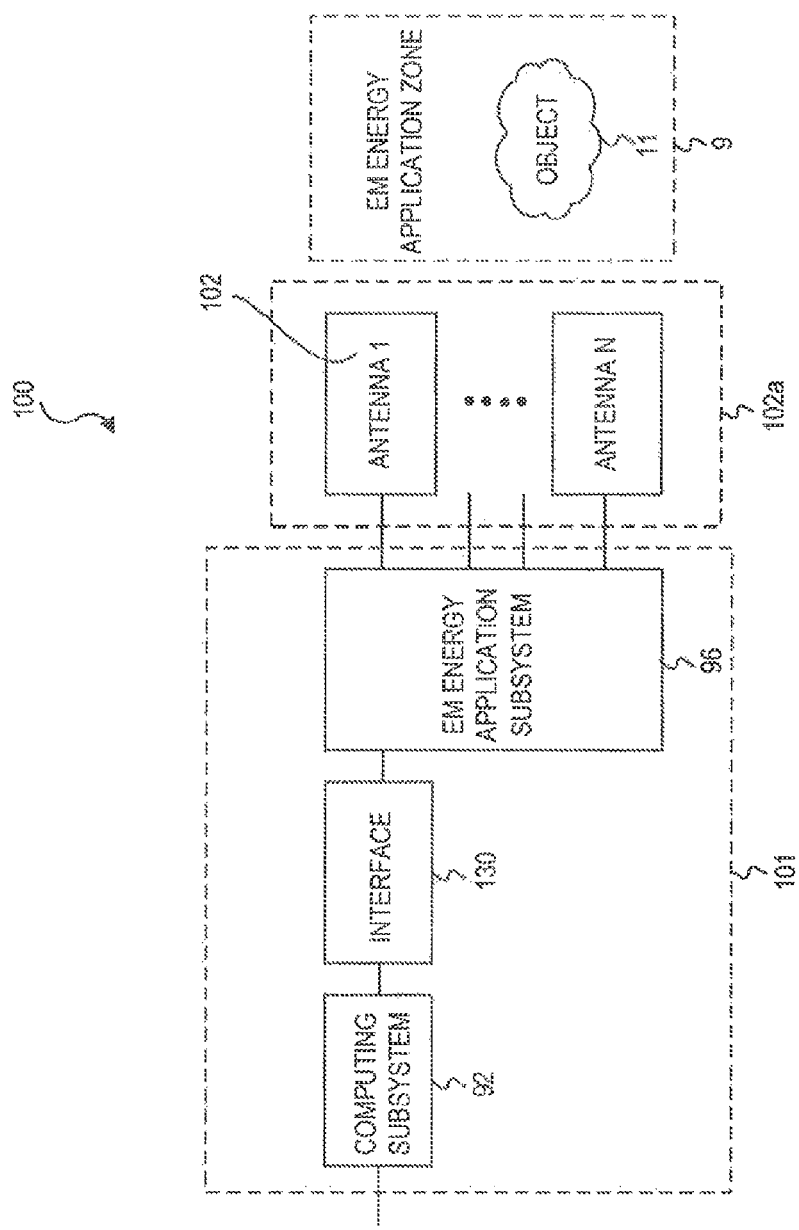
FIG. 1 is a diagrammatic representation of an apparatus for applying EM energy to an object, in accordance with some exemplary embodiments of the present invention.

In certain embodiments, the application of EM energy may occur in an "energy application zone", such as energy application zone 9, as shown in FIG. 1. Energy application zone 9 may include any void, location, region, or area where EM energy may be applied. It may be hollow, or may be filled or partially filled with liquids, solids, gases, or combinations thereof. By way of example only, energy application zone 9 may include an interior of an enclosure, interior of a partial enclosure, open space, solid, or partial solid, that allows existence, propagation, and/or resonance of EM waves. Zone 9 may include a conveyor belt or a rotating plate. For purposes of this disclosure, all such energy application zones may alternatively be referred to as cavities. It is to be understood that an object is considered "in" the energy application zone if at least a portion of the object is located in the zone or if some portion of the object receives delivered EM radiation.

Application of EM energy may result in excitation of an EM field of particular pattern in the energy application zone. The field pattern may be determined, or at least influenced by one or more parameters.

The term "modulation space" or "MS" is used to collectively refer to all the parameters that may affect a field pattern in the energy application zone and all combinations thereof. In some embodiments, the "MS" may include all possible components that may be used and their potential settings (absolute and/or relative to others) and adjustable parameters associated with the components. For example, the "MS" may include a plurality of variable parameters, the number of antennas, their positioning and/or orientation (if modifiable), the useable bandwidth, a set of all useable frequencies and any combinations thereof, power settings, phases, etc. The MS may have any number of possible variable parameters, ranging between one parameter only (e.g., a one dimensional MS limited to frequency only or phase only—or other single parameter), two or more dimensions (e.g., varying frequency and amplitude or varying frequency and phase together within the same MS), or many more.

Each variable parameter associated with the MS is referred to as an MS dimension. By way of example, a three dimensional modulation space has three dimensions, for example frequency (F), phase (P), and amplitude (A). In such three dimensional MS, frequency, phase, and amplitude (e.g., an amplitude difference between two or more waves being transmitted at the same time) of the EM waves are modulated during energy supply, while all the other parameters may be fixed during energy supply. The MS may have any number of dimensions, e.g., one dimension, two dimensions, four dimensions, n dimensions, etc. In one example, a one dimensional modulation space oven may provide MSEs that differ one from the other only by frequency, The term "modulation space element" or "MSE," may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. For example, a three-dimensional MSE may include a specific frequency $F(i)$, a specific phase $P(i)$, and a specific amplitude $A(i)$. If even one of these MSE variables changes, then the new set defines another MSE. For example, (3 GHz, 30°, 12 V) and (3 GHz, 60°, 12 V) are two different MSEs, although they differ only in the phase component.

Differing combinations of these MS parameters may lead to differing field patterns across the energy application zone and differing energy distribution patterns in the object. A plurality of MSEs that can be executed sequentially or simultaneously to excite a particular field pattern in the energy application zone may be collectively referred to as an "energy application scheme." For example, an energy application scheme may consist of three MSEs: $(F(1), P(1), A(1))$; $(F(2), P(2), A(2))$; $(F(3), P(3), A(3))$. Such an energy application scheme may result in applying the first, second, and third MSE to the energy application zone.

The invention, in its broadest sense, is not limited to any particular number of MSEs or MSE combinations. Various MSE combinations may be used depending on the requirements of a particular application and/or on a desired energy transfer profile, and/or given equipment, e.g., cavity dimensions. The number of options that may be employed could be as few as two or as many as the designer desires, depending on factors such as intended use, level of desired control, hardware or software resolution and cost.

In accordance with some embodiments of the invention, an apparatus or method may involve the use of at least one source configured to apply EM energy to the energy application zone. A "source" may include any component(s) that are suitable for generating and supplying EM energy, for example, an RF power source(s), amplifier(s) (e.g., solid state amplifier), waveguide(s), radiating element(s), etc.

Consistent with some embodiments of the invention, EM energy may be applied to the energy application zone in the form of propagating EM waves at selected wavelengths or frequencies (also known as EM radiation). As used consistently herein, "propagating EM waves" may include resonating waves, evanescent waves, and waves that travel through a medium in any other manner. EM radiation carries energy that may be imparted to (or dissipated into) matter with which it interacts.

As used herein, if a machine (e.g., a processor) is described as "configured to" perform a task (e.g., configured to cause application of a selected field pattern), then, at least in some embodiments, the machine may include components, parts, or aspects (e.g., software) that enable the machine to perform the task. In some embodiments, the machine may also perform this task during operation. Similarly, when a task is described as being done "in order to" establish a target result (e.g., in order to apply a plurality of EM field patterns to the object), then, at least in some embodiments, carrying out the task would accomplish the target result wholly or partially.

In certain embodiments, EM energy may be applied to an object 11. Any reference to an "object" (or "object to be heated" or "object to be processed") to which EM energy is applied is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" encompasses such matter as food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply, even nominally, EM energy.

In some embodiments, a portion of EM energy applied to energy application zone 9 (e.g., via the radiating elements) may be absorbed by object 11. In some embodiments, another portion of the EM energy applied or delivered to energy application zone 9 may be absorbed by various elements (e.g., food residue, particle residue, additional objects, structures associated with zone 9, or any other EM enemy-absorbing materials found in zone 9) associated with energy application zone 9. Energy application zone 9 may also include loss constituents that do not, themselves, absorb an appreciable amount of EM energy, but otherwise account for EM energy losses. Such loss constitutes may include, for example, cracks, seams, joints, doors, an interface between a door and a cavity or any other loss mechanisms associated with energy application zone 9. Thus, in some embodiments, a load may include at least a portion of object 11 along with any EM energy-absorbing constituents in the energy application zone as well as any EM energy loss constituents associated with the zone.

FIG. 1 is a diagrammatic representation of an apparatus 100 for applying EM energy to an object, in accordance with some embodiments of the invention. Apparatus 100 may include a controller 101, an array 102a of radiating elements 102 (e.g., antennas) including one or more radiating elements, and energy application zone 9. Controller 101 may be electrically coupled to one or more radiating elements 102. As used herein, the term "electrically coupled" refers to one or more either direct or indirect electrical connections. Controller 101 may include a computing subsystem 92, an interface 130, and an EM energy application subsystem 96. Based on an output of computing subsystem 92, energy application subsystem 96 may respond by generating one or more radio frequency signals to be supplied to radiating elements 102. In turn, the one or more radiating elements 102 may radiate EM energy into energy application zone 9. In certain embodiments, this energy may interact with object 11 positioned within energy application zone 9.

Consistent with the presently disclosed embodiments, computing subsystem 92 may include a general purpose or special purpose computer. Computing subsystem 92 may be configured to generate control signals for controlling EM energy application subsystem 96 via interface 130. Computing subsystem 92 may further receive measured signals from EM energy application subsystem 96 via interface 130.

While controller 101 is illustrated for exemplary purposes as having three subcomponents, control functions may be consolidated in fewer components, or additional components may be included consistent with the desired function and/or design of a particular embodiment. For example— EM energy application subsystem 96 may not be part of controller 101.

Exemplary energy application zone 9 may include locations where energy is applied—it may make part of an oven, chamber, tank, dryer, thawer, dehydrator, reactor, engine, chemical or biological processing apparatus, furnace, incinerator, material shaping or forming apparatus, conveyor, combustion zone, cooler, freezer, etc. In some embodiments, the energy application zone may be part of a vending machine, in which objects are processed once purchased. Thus, consistent with the presently disclosed embodiments, energy application zone 9 may include an EM resonator 10 (also known as cavity resonator, or cavity) (illustrated for example in FIG. 2A). At times, energy application zone 9 may be congruent with the object or a portion of the object (e.g., the object or a portion thereof, is or may define the energy application zone).

Figure 2A:
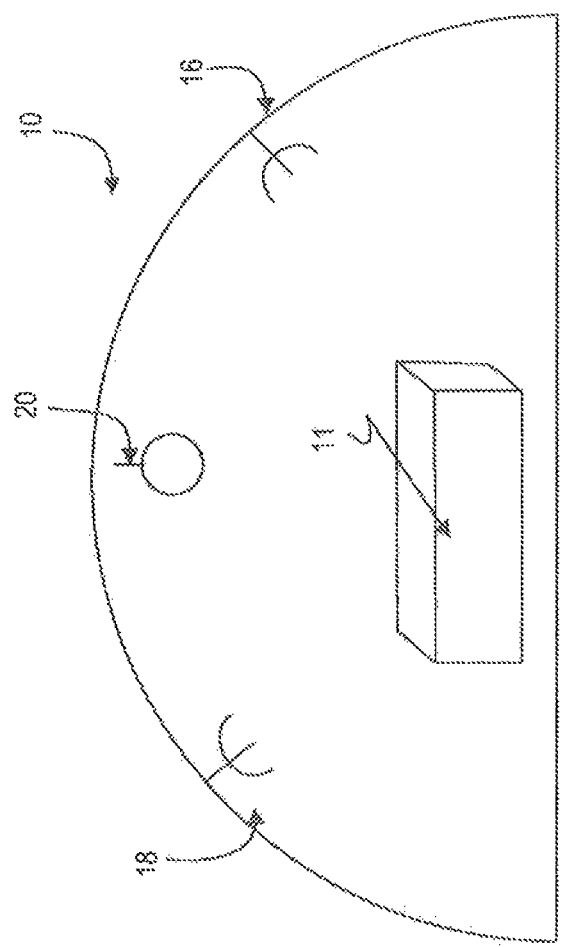
FIG. 2A is a view of a cavity, in accordance with some exemplary embodiments of the present invention.

FIG. 2A shows a sectional view of a cavity 10, which is one exemplary embodiment of energy application zone 9. Cavity 10 may be cylindrical in shape (or any other suitable shape, such as semi-cylindrical, rectangular, elliptical, cuboid, symmetrical, asymmetrical, irregular, and regular, among others) and may be made of a conductor, such as aluminum, stainless steel or any suitable metal or other conductive material. In some embodiments, cavity 10 may include walls coated and/or covered with a protective coating, for example, made from materials transparent to EM energy, e.g., metallic oxides or others. In some embodiments, cavity 10 may have a spherical shape or hemispherical shape (for example as illustrated in FIG. 2A). Cavity 10 may be resonant in a selected range of frequencies (e.g., within the UHF or microwave range of frequencies, such as between 300 MHz and 3 GHz, or between 400 MHz and 1 GHZ). It is also contemplated that cavity 10 may be closed, e.g., completely enclosed (e.g., by conductor materials), bounded at least partially, or open, e.g., having non-bounded openings. The general methodology of the invention is not limited to any particular cavity shape or configuration, as discussed earlier. FIG. 2A shows a sensor 20 and antennas 16 and 18 (examples of radiating elements 102 shown in FIG. 1).

FIG. 2B shows a top sectional view of a cavity 200 according to another exemplary embodiment of energy application zone 9. FIG. 2B shows antennas 210 and 220 (as examples of radiating elements 102 shown in FIG. 1). Cavity 200 comprises a space 230 for receiving object 11 (not shown). Space 230, as shown between the dotted lines in FIG. 2B, has an essentially rectangular cross section, which may be adapted for receiving a tray on top of which object 11 may be placed.

In some embodiments, field adjusting element(s) (not illustrated) may be provided in energy application zone 9, for example, in cavity 10 and/or cavity 200. Field adjusting element(s) may be adjusted to change the EM wave pattern in the cavity in a way that selectively directs the EM energy from one or more of antennas 16 and 18 (or 210 and 220) into object 11. Additionally or alternatively, field adjusting element(s) may be further adjusted to simultaneously match at least one of the antennas that act as transmitters, and thus reduce coupling to the other antennas that act as receivers. An antenna that acts as a receiver may also be considered as a sensor.

Additionally, one or more sensor(s) (or detector(s)) 20 may be used to sense (or detect) information (e.g., signals) relating to object 11 and/or to the energy application process and/or the energy application zone. For example—sensors (20) may send a feedback signal to controller 101 (e.g., to computing subsystem 92). At times, one or more antennas, e.g., antenna 16, 18, 210 or 220, may be used as sensors. The sensors may be used to sense any information, including EM power, temperature, weight, humidity, motion, etc. The sensed information may be used for any purpose, including process verification, automation, authentication, safety, etc.

Automation may be affected, for example, by adjusting RF parameters, such as energy application time, power level, emitted frequency, phase, etc., in accordance with a feedback on the processed object received by the sensor(s). For example, stopping or adjusting the processing, e.g., heating, once the sensor(s) indicate that certain stopping or adjusting criteria are met, for example, once sufficient amount of energy is absorbed in the object, once one or more portions of the object are at a selected temperature, once time derivatives of absorbed power changes. Such automatic processing adjustment or stoppage may be useful, for instance, in vending machines, where food products are kept cooled or at room temperature, and heated or cooked only when purchased. Purchase may start the heating, and specific heating conditions (for example, energy supplied at each MSE) are determined in accordance with feedback from the heated product. Additionally or alternatively, heating is stopped once the sensors sense conditions that are defined to the controller as stopping criteria. Additionally or alternatively, cooking or processing instructions may be provided on a machine readable element, e.g., barcode or a tag, associated with the processed object (e.g., heated food product, purchased in the vending machine).

In the presently disclosed embodiments, more than one feed and/or a plurality of radiating elements (e.g., antennas) may be provided. The radiating elements may be adjacent to one or more walls of cavity 10, or otherwise located on one or more surfaces of, e.g., an enclosure defining the energy application zone). Alternatively, radiating elements may be located inside or outside the energy application zone One or more of the radiating elements may be near to, in contact with, in the vicinity of or even embedded in object 11 (e.g., when the object is a liquid). The orientation and/or configuration of each radiating element may be distinct or the same, based on the specific energy application, e.g., based on a desired target effect. Each radiating element may be positioned, adjusted, and/or oriented to transfer EM waves along a same direction, or various different directions. Furthermore, the location, orientation, and configuration of each radiating element may be selected before applying energy to the object. Alternatively or additionally, the location, orientation, and configuration of each radiating element may be dynamically adjusted, for example, by using a processor, during operation of the apparatus and/or between rounds of energy application. The invention is not limited to radiating elements having particular structures or locations within the apparatus.

As represented by the block diagram of FIG. 1, apparatus 100 may include at least one radiating element 102 in the form of at least one antenna for applying of EM energy to energy application zone 9. One or more of the radiating elements (e.g., antenna(s)) may also be configured to receive EM energy from energy application zone 9. In other words, radiating element, as used herein may function as a transmitter, a receiver, or both, depending on a particular application and configuration. When a radiating element acts as a receiver of EM energy from an energy application zone (e.g., reflected EM waves), the radiating element receives EM energy from the energy application zone.

As used herein, the terms "radiating element" and "antenna" may broadly refer to any structure from which EM energy may radiate and/or be received. For example, a radiating element or an antenna may include an aperture/slot antenna, or an antenna which includes a plurality of terminals transmitting in unison, either at the same time or at a controlled dynamic phase difference (e.g., a phased array antenna). Consistent with some exemplary embodiments, radiating elements 102 may include an EM energy transmitter (referred to herein as "a transmitting antenna" or "emitting radiating element") that feeds energy into EM energy application zone 9, an EM energy receiver (referred herein as "a receiving antenna") that receives energy from zone 9, or a combination of both a transmitter and a receiver. For example, a first antenna may be configured to emit EM energy to zone 9, and a second antenna may be configured to receive energy from the first antenna. In some embodiments, one or more antennas may each serve as both receivers and transmitters. In some embodiments, one or more antennas may serve a dual function while one or more other antennas may serve a single function. So, for example, a single antenna may be configured to both emit EM energy to the zone 9 and to receive EM energy via the zone 9; a first antenna may be configured to emit EM energy to the zone 9, and a second antenna may be configured to receive EM energy via the zone 9; or a plurality of antennas could be used, where at least one of the plurality of antennas may be configured to both emit EM energy to zone 9 and to receive EM energy via zone 9. At times, in addition to or as an alternative to emitting and/or receiving energy, an antenna may also be adjusted to affect the field pattern. For example, various properties of the antenna, such as position, location, orientation, etc., may be adjusted. Different antenna property settings may result in differing EM field patterns within the energy application zone thereby affecting energy absorption in the object. Therefore, antenna adjustments may constitute one or more variables that can be varied for energy application control.

Consistent with the presently disclosed embodiments, energy may be supplied to one or more transmitting antennas. Energy supplied to a transmitting antenna may result in energy emitted by the transmitting antenna (referred to herein as "incident energy"). The incident energy may be delivered to zone 9, and may be in an amount equal to an amount of energy supplied to the transmitting antenna(s) by a source. A portion of the incident energy may be dissipated in the object or absorbed by the object (referred to herein as "dissipated energy" or "absorbed energy"). Another portion may be reflected back to the transmitting antenna (referred to herein as "reflected energy"). Reflected energy may include, for example, energy reflected back to the transmitting antenna due to mismatch caused by the object and/or the energy application zone, e.g., impedance mismatch. Reflected energy may also include energy retained by the port of the transmitting antenna (e.g., energy that is emitted by the antenna but does not flow into the zone). The rest of the incident energy, other than the reflected energy and dissipated energy, may be coupled to one or more receiving antennas other than the transmitting antenna (referred to herein as "coupled energy."). Therefore, the incident energy ("I") supplied to the transmitting antenna may include all of the dissipated energy ("D"), reflected energy ("R"), and coupled energy ("C"), and may be expressed according to the relationship:

$$I=D+T+R.$$

In accordance with certain aspects of the invention, the one or more transmitting antennas may deliver EM energy into zone 9. Energy delivered by a transmitting antenna into the zone (referred to herein as "delivered energy" or (d)) may be the incident energy emitted by the antenna minus the reflected energy at the same antenna. That is, the delivered energy may be the net energy that flows from the transmitting antenna to the zone, i.e., d=I−R. Alternatively, the delivered energy may also be represented as the sum of dissipated energy and transmitted energy, i.e., d=D+C (where C=ΣCi).

In certain embodiments, the application of EM energy may occur via one or more power feeds. A feed may include one or more waveguides and/or one or more radiating elements (e.g., antennas 102) for applying EM energy to the zone. Such radiating elements may include, for example, patch antennas, fractal antennas, helix antennas, log-periodic antennas, spiral antennas, slot antennas, dipole antennas, loop antennas, slow wave antennas, leaky wave antennas or any other structures capable of transmitting and/or receiving EM energy.

The invention is not limited to radiating elements having particular structures or locations. Radiating elements, e.g., antenna 102, may be polarized in differing directions in order to, for example, reduce coupling, enhance specific field pattern(s), increase the energy delivery efficiency and support and/or enable a specific algorithm(s). The foregoing are examples only, and polarization may be used for other purposes as well. In one example, three antennas may be placed parallel to orthogonal coordinates, however, it is contemplated that any suitable number of antennas (such as one, two, three, four, five, six, seven, eight, etc.) may be used. For example, a higher number of antennas may add flexibility in system design and improve control of energy distribution, e.g., greater uniformity and/or resolution of energy application in zone 9.

In certain embodiments, there may be provided at least one processor. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The at least one processor may be coincident with or may be part of controller 101.

The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

The at least one processor may be configured to cause EM energy to be applied to zone 9 via one or more antennas, for example across a series of MSEs, in order to apply EM energy at each such MSE to object 11. For example, the at least one processor may be configured to regulate one or more components of controller 101 in order to cause the energy to be applied.

In certain embodiments, the at least one processor may be configured to determine a value indicative of energy absorbable by the object at each of a plurality of MSEs. This may occur, for example, using one or more lookup tables, by pre-programming the processor or memory associated with the processor, and/or by testing an object in an energy application zone to determine its absorbable energy characteristics. One exemplary way to conduct such a test is through a sweep.

As used herein, a sweep may include, for example, the transmission over time of energy at more than one MSE. For example, a sweep may include the sequential transmission of energy at multiple MSEs in one or more contiguous MSE band; the sequential transmission of energy at multiple MSEs in more than one non-contiguous MSE band; the sequential transmission of energy at individual non-contiguous MSEs; and/or the transmission of synthesized pulses having a desired MSE/power spectral content (e.g., a synthesized pulse in time). The MSE bands may be contiguous or non-contiguous. Thus, during an MSE sweeping process, the at least one processor may regulate the energy supplied to the at least one antenna to sequentially deliver EM energy at various MSEs to zone 9, and to receive feedback which serves as an indicator of the energy absorbable by object 11. While the invention is not limited to any particular measure of feedback indicative of energy absorbable in the object, various exemplary indicative values are discussed below.

During the sweeping process, EM energy application subsystem 96 may be regulated to receive EM energy reflected and/or coupled at radiating elements(s) (e.g., antenna(s)) 102, and to communicate the measured energy information (e.g., information pertaining to and/or related to and/or associated with the measured energy) back to computing subsystem 92 via interface 130, as illustrated in FIG. 1. Computing subsystem 92 may then be regulated to determine a value indicative of energy absorbable by object 11 at each of a plurality of MSEs based on the received information. Consistent with some of the presently disclosed embodiments, a value indicative of the absorbable energy may include a dissipation ratio (referred to herein as "DR") associated with each of a plurality of MSEs. As referred to herein, a "dissipation ratio" (or "absorption efficiency" or "power efficiency"), may be defined as a ratio between EM energy absorbed by object 11 and EM energy supplied into EM energy application zone 9. In some embodiments, dissipation ratio may be defined as a ratio between EM energy absorbed by object 11 and EM energy delivered to zone 9. The delivered energy may be defined as the difference between the energy supplied to a radiating element and the energy reflected back to the radiating element.

Energy that may be dissipated or absorbed by an object is referred to herein as "absorbable energy" or "absorbed energy". Absorbable energy may be an indicator of the object's capacity to absorb energy or the ability of the apparatus to cause energy to dissipate in a given object (for example—an indication of the upper limit thereof). In some of the presently disclosed embodiments, absorbable energy may be calculated as a product of the incident energy (e.g., maximum incident energy) supplied to the at least one antenna and the dissipation ratio. Reflected energy (e.g., the energy not absorbed or transmitted) may, for example, be a value indicative of energy absorbed by the object. By way of another example, a processor might calculate or estimate absorbable energy based on the portion of the incident energy that is reflected and the portion that is coupled. That estimate or calculation may serve as a value indicative of absorbed and/or absorbable energy.

During an MSE sweep, for example, the at least one processor may be configured to control a source of EM energy such that energy is sequentially supplied to one or more radiating elements at a series of MSEs. The at least one processor might then receive a signal indicative of energy (or power) reflected at each MSE and, optionally, also a signal indicative of the energy (or power) coupled to other antennas at each MSE. Using a known amount of incident energy supplied to the antenna and a known amount of energy reflected and/or coupled (e.g., thereby indicating an amount of energy absorbed at each MSE), an absorbable energy indicator may be calculated or estimated. Alternatively, the processor might simply rely on an indicator of reflection and/or coupling as a value indicative of absorbable energy.

Absorbable energy may also include energy that may be dissipated by the structures of the energy application zone in which the object is located (e.g., cavity walls) or leakage of energy at an interface between an oven cavity and an oven door. In some embodiments, the amount of EM energy absorbed in the cavity walls may be substantially small, and thus, the amount of EM energy absorbed in the object may be substantially equal to the amount of absorbable energy.

In some of the presently disclosed embodiments, a dissipation ratio may be calculated using formula (1):

$$DR = P_{abs}/P_{in} \tag{1}$$

Wherein $P_{abs}$ is the power adsorbed in the object, and $P_{in}$ is the incident power.

The dissipated (i.e. absorbed) power may be equated with the difference between the incident power and the power detected by sensors in or around the cavity. If these sensors are only the radiating elements, equation (1) may be equivalent to equation (1a).

$$DR = (P_{in} - P_{rf} - P_{cp})/P_{in} \tag{1a}$$

where $P_{in}$ represents the EM energy and/or power supplied to antennas 102, $P_{rf}$ represents the EM energy and/or power reflected/returned at the antenna that function as transmitter, and $P_{cp}$ represents the EM energy and/or power coupled at those antennas that function as receivers. The nominator, $(P_{in} - P_{rf} - P_{cp})$ may be referred to as "non-detected power", since this power is not detected to leave the energy application zone, but is known to enter. Alternatively or additionally, the nominator may be referred to as "absorbed power", since it may provide a good estimation to the adsorbed power; and estimation that may be accurate if no power is lost by any mechanism (e.g., cavity walls) other than being absorbed by the object. The terms "non-detected energy" and "absorbed energy" may be similarly used to refer to the difference between incident energy on the one hand, and the sum of reflected and coupled energies on the other hand. DR may be a unit-less value between 0 and 1, and thus may be represented by a percentage number.

Alternatively or additionally, another kind of dissipation ratio may be calculated using formula (2a):

$$\Delta\rho = P_{abs}/(P_{in} - P_{rf}) \tag{2a}$$

Replacing $P_{abs}$ with $(P_{in} - P_{rf} - P_{cp})$, as done above may result in equation (2b) for $\Delta\rho$:

$$\Delta\rho = (P_{in} - P_{rf} - P_{cp})/(P_{in} - P_{rf}) \tag{2b}$$

This dissipation ratio may measure the amount of dissipated power (or non-detected power) as a portion of the delivered power, that is, the power that was emitted and did not return to the emitting radiating element. It is noted that the incident, reflected, and coupled powers may also be indicative of the respective energies. This dissipation ratio may be useful to identify frequencies at which the object absorbs a lot of the energy delivered to the energy application zone, even if only a small portion of the supplied energy is delivered to the zone, and a large portion is reflected back to or retained at the emitting radiating element, for example, due to poor matching. The use of $\Delta\rho$ may be limited to apparatuses that provide energy via two or more radiating elements, because if only one radiating element exists, no energy may be coupled from one radiating element to another, and $\Delta\rho$ may equal 1 by definition.

For example, consistent with an embodiment which is designed for three antennas 1, 2, and 3, computing subsystem 92 may be configured to determine input reflection coefficients $S_{11}$, $S_{22}$, and $S_{33}$ and the transfer coefficients (which may also be referred to as transmission coefficients) may be $S_{12}=S_{21}$, $S_{13}$, $S_{23}=S_{32}$ based on a measured power and/or energy information during the sweep. Accordingly, the dissipation ratio DR corresponding to antenna 1 may be determined based on the above mentioned reflection and transmission coefficients, according to formula (3):

$$DR_1 = 1 - (|S_{11}|^2 + |S_{12}|^2 + |S_{13}|^2). \tag{3}$$

Similarly, the dissipation ratio $\Delta\rho$ corresponding to antenna 1 may be determined based on the above mentioned reflection and transmission coefficients, according to formula (3a):

$$\Delta\rho 1 = [1 - (|S_{11}|^2 + |S_{12}|^2 + |S_{13}|^2)]/(1 - |S_{11}|^2) = DR1/(1 - |S_{11}|^2) \tag{3a}$$

In some embodiments, a common DR may be defined for the two radiating elements:

$$DR_{1+2} = P_{abs}/(P_{in1} + P_{in2})$$

$$DR_{1+2} = [(P_{in1} + P_{in2}) - (P_{out1} P_{out2})]/(P_{in1} + P_{in2})$$

wherein the $P_{in1}$ and $P_{in2}$ are the power (or energy) incident at radiating element 1 and 2, respectively.

The value indicative of the absorbable energy may further involve the maximum incident energy associated with a power amplifier (not illustrated) of subsystem 96 at the given MSE. As referred herein, a "maximum incident energy" may be defined as the maximal power that may be provided to the antenna at a given MSE throughout a given period of time. Thus, one alternative value indicative of absorbable energy may be the product of the maximum incident energy and the dissipation ratio. These are just two examples of values that may be indicative of absorbable energy which could be used alone or together as part of control schemes implemented in controller 101. Alternative indicators of absorbable energy may be used, depending for example on the structure employed and the application, In certain embodiments, the at least one processor may also be configured to cause energy to be supplied to the at least one radiating element in at least a subset of a plurality of MSEs. Energy transmitted to the zone at each of the subset of MSEs may be a function of the absorbable energy value at the corresponding MSE. For example, energy transmitted to the zone at MSE(i) may be a function of the absorbable energy value at MSE(i). The energy supplied to at least one antenna 102 at each of the subset of MSEs may be determined as a function of the absorbable energy value at each MSE (e.g., as a function of a dissipation ratio, maximum incident energy, a combination of the dissipation ratio and the maximum incident energy, or some other indicator). In some embodiments, the subset of the plurality of MSEs and/or the energy emitted to the zone at each of the subset of MSEs may be determined based on or in accordance with a result of absorbable energy information (e.g., absorbable energy feedback) obtained during an MSE sweep (e.g., at the plurality of MSEs). That is, using the absorbable energy information, the at least one processor may adjust energy supplied at each MSE such that the energy at a particular MSE may in some way be a function of an indicator of absorbable energy at that MSE. The functional correlation may vary depending upon application and/or a desired target effect, e.g., a more uniform energy distribution profile may be desired across object 11. The invention is not limited to any particular scheme, but rather may encompass any technique for controlling the energy supplied by taking into account an indication of absorbable energy.

In certain embodiments, the at least one processor may be configured to cause energy to be supplied to the at least one radiating element in at least a subset of the plurality of MSEs, wherein energy applied to the zone at each of the subset of MSEs is inversely related to the absorbable energy value at the corresponding MSE. Such an inverse relationship may involve a general trend—e.g., when an indicator of absorbable energy in a particular MSE subset (i.e., one or more MSEs) tends to be relatively high, the actual incident energy at that MSE subset may be relatively low. When an indicator of absorbable energy in a particular MSE subset tends to be relatively low, the incident energy may be relatively high. This substantially inverse relationship may be even more closely correlated. For example, the supplied energy may be set such that its product with the absorbability indicator (i.e., a value indicative of the energy absorbable by object 11) is substantially constant across the MSEs applied.

Some exemplary energy application schemes may lead to more spatially uniform energy absorption in the object. As used herein, "spatial uniformity" may refer to a condition where the absorbed energy across the object or a portion (e.g., a selected portion) of the object that is targeted for energy application is substantially constant (for example per volume unit or per mass unit). In some embodiments, the energy absorption is considered "substantially constant" if the variation of the dissipated energy at different locations of the object is lower than a threshold value. For instance, a deviation may be calculated based on the distribution of the dissipated energy in the object, and the absorbable energy is considered "substantially constant" if the deviation between the dissipation values of different parts of the object is less than 50%. Because in many cases spatially uniform energy absorption may result in spatially uniform temperature increase, consistent with the presently disclosed embodiments, "spatial uniformity" may also refer to a condition where the temperature increase across the object or a portion of the object that is targeted for energy application is substantially constant. The temperature increase may be measured by a sensing device, for example a temperature sensor provided in zone 9. In some embodiments, spatial uniformity may be defined as a condition, where a given property of the object is uniform or substantially uniform after processing, e.g., after a heating process. Examples of such properties may include temperature, readiness degree (e.g., of food cooked in the oven), mean particle size (e.g., in a sintering process), etc.

In order to achieve control over the energy absorption in an object or a portion of an object, controller 101 may be configured to hold substantially constant the time duration at which energy is supplied to radiating elements 102 at each MSE, while varying the amount of power supplied at each MSE as a function of the absorbable energy value. In some embodiments, controller 101 may be configured to cause the energy to be supplied to the antenna at a particular MSE or MSEs at a power level substantially equal to a maximum power level of the device and/or the amplifier at the respective MSE(s) or other constant power level (which may or may not equal for all the MSEs).

Alternatively or additionally, controller 101 may be configured to vary the period of time during which energy is applied at each MSE as a function of the absorbable energy value. At times, both the duration and power at which each MSE is applied are varied as a function of the absorbable energy value. Varying the power and/or duration of energy supplied at each MSE may be used to cause substantially uniform energy absorption in the object or to have a controlled spatial pattern of energy absorption, for example, based on feedback regarding the dissipation properties of the object at each transmitted MSE.

Consistent with some embodiments, controller 101 may be configured to cause the source (e.g., by controlling the amplifier) to supply no energy at all at particular MSE(s). Similarly, if the absorbable energy value exceeds a selected threshold, controller 101 may be configured to cause the antenna to supply energy at a power level less than a maximum power level of the antenna.

Because absorbable energy can change based on a host of factors including object temperature, in some embodiments, it may be beneficial to regularly update (e.g., by measuring feedback signals and/or calculations based on such measurements) absorbable energy values and adjust energy application based on the updated absorbable values. These updates can occur multiple times a second, or can occur every few seconds or longer, depending on the requirements of a particular application, In accordance with an aspect of some embodiments of the invention, the at least one processor (e.g., controller 101 or processor 2030, discussed below) may be configured to determine a desired and/or target energy absorption level at each of a plurality of MSEs and adjust energy supplied to the antennas at each MSE in order to obtain the target energy absorption level at each MSE. For example, controller 101 may be configured to target a desired energy absorption level at each MSE in order to achieve or approximate substantially uniform energy absorption across a range of MSEs.

Alternatively, controller 101 may be configured to provide a target energy absorption level at each of a plurality of object portions, which collectively may be referred to as an energy absorption profile across the object. An absorption profile may include uniform energy absorption in the object, non-uniform energy absorption in the object, differing energy absorption values in differing portions of the object, substantially uniform absorption in one or more portions of the object, or any other desirable pattern of energy absorption in an object or portion(s) of an object.

Reference is now made to FIG. 3A, which provides a diagrammatic representation of an exemplary apparatus 100 for applying EM energy to an object, in accordance with some embodiments of the present invention. In accordance with some embodiments, apparatus 100 may include a processor 2030 which may regulate modulations performed by modulator 2014. In some embodiments, modulator 2014 may include at least one of a phase modulator, a frequency modulator, and an amplitude modulator configured to modify the phase, frequency and amplitude of an AC waveform generated by power supply 2012. Processor 2030 may alternatively or additionally regulate at least one of location, orientation, and configuration of each radiating element 2018, for example, using an electro-mechanical device. Such an electromechanical device may include a motor or other movable structure for rotating, pivoting, shifting, sliding or otherwise changing the orientation and/or location of one or more of radiating elements 2018. Alternatively or additionally, processor 2030 may be configured to regulate one or more field adjusting elements located in the energy application zone, in order to change the field pattern in the zone, In some embodiments, apparatus 100 may involve the use of at least one source configured to deliver EM energy to the energy application zone. By way of example, and as illustrated in FIG. 3A, the source may include one or more of a power supply 2012 configured to generate EM waves that carry EM energy. For example, power supply 2012 may be a magnetron configured to generate high power microwave waves at a selected wavelength or frequency. Alternatively, power supply 2012 may include a semiconductor oscillator, such as a voltage controlled oscillator, configured to generate AC waveforms (e.g., AC voltage or current) with a constant or varying frequency and/or solid-state amplifier. AC waveforms may include sinusoidal waves, square waves, pulsed waves, triangular waves, or another type of waveforms with alternating polarities. Alternatively, a source of EM energy may include any other power supply, such as EM field generator, EM flux generator, or any mechanism for generating vibrating electrons.

In some embodiments, apparatus 100 may include a phase modulator (which may be included, for example, in modulator 2014) that may be controlled to perform a selected sequence of time delays on an AC waveform, such that the phase of the AC waveform is increased by a number of degrees (e.g., 10 degrees) for each of a series of time periods. In some embodiments, processor 2030 may dynamically and/or adaptively regulate modulation based on feedback from the energy application zone. For example, processor 2030 may be configured to receive an analog or digital feedback signal from detector 2040. This signal may constitute electromagnetic feedback, indicating, for example, an amount of EM energy received from cavity 10, and processor 2030 may dynamically determine a time delay at the phase modulator for the next time period based on the received feedback signal. In some embodiments, detector 2040 may be associated with a dual directional coupler to measure the reflected energy and/or coupled energy.

In some embodiments, apparatus 100 may include a frequency modulator (not illustrated). The frequency modulator may include a semiconductor oscillator configured to generate an AC waveform oscillating at a selected frequency. The selected frequency may be in association with an input voltage, current, and/or other signal (e.g., analog or digital signals). For example, a voltage controlled oscillator may be configured to generate waveforms at frequencies proportional to the input voltage.

Processor 2030 may be configured to regulate an oscillator (not illustrated) to sequentially generate AC waveforms oscillating at various frequencies within one or more selected frequency bands. In some embodiments, a selected frequency band may include a working frequency band, and the processor may be configured to cause the supply of energy at frequencies within a sub-portion of the working frequency band. A working frequency band may be a collection of frequencies selected because, in the aggregate, they achieve a desired goal, and there is diminished need to use other frequencies in the band if that sub-portion achieves the goal. Once a working frequency band (or subset or sub-portion thereof) is identified, the processor may sequentially apply power at each frequency in the working frequency band (or subset or sub-portion thereof). This sequential process may be referred to as "frequency sweeping." In some embodiments, based on the feedback signal provided by detector 2040, processor 2030 may be configured to select one or more frequencies from a frequency band, and regulate an oscillator to sequentially generate AC waveforms at these selected frequencies.

Alternatively or additionally, processor 2030 may be further configured to regulate amplifier 2016 to adjust amounts of energy supplied to radiating elements 2018, based on the feedback signal. Consistent with some embodiments, detector 2040 may detect an amount of energy reflected from the energy application zone and/or energy coupled at a particular frequency, and processor 2030 may be configured to cause the amount of energy supplied at that frequency to be low when the reflected energy and/or transmitted energy is low. Additionally or alternatively, processor 2030 may be configured to cause one or more antennas to supply energy at a particular frequency over a short duration when the reflected energy is low at that frequency.

In some embodiments, the apparatus may include more than one source of EM energy. For example, more than one oscillator may be used for generating AC waveforms of differing frequencies. The separately generated AC waveforms may be amplified by one or more amplifiers. Accordingly, at any given time, radiating elements 2018 may be caused to simultaneously emit EM waves at, for example, at two differing frequencies to cavity 10.

Processor 2030 may be configured to regulate the phase modulator in order to after a phase difference between two EM waves supplied to the energy application zone (e.g., regulate a phase difference between two radiating elements). In some embodiments, the source of EM energy may be configured to supply EM energy in a plurality of phases, and the processor may be configured to cause the transmission of energy at a subset of the plurality of phases. By way of example, the phase modulator may include a phase shifter. The phase shifter may be configured to cause a time delay in the AC waveform in a controllable manner within cavity 10, delaying the phase of an AC waveform anywhere from between 0-360 degrees.

In some embodiments, a splitter (not illustrated) may be provided in apparatus 100 to split an AC signal, for example generated by an oscillator, into two AC signals (e,g, split signals). Processor 2030 may be configured to regulate the phase shifter to sequentially cause various time delays such that the phase difference between two split signals may vary over time. This sequential process may be referred to as "phase sweeping." Similar to the frequency sweeping described above, phase sweeping may involve a working subset of phases selected to achieve a desired energy application goal. In some embodiments, phase difference between two signals may be obtained directly from the power source—for example: the output frequency and the phase emitted from each radiating element may be determined by the source (for example: by using Direct Digital Synthesizer).

The processor may be configured to regulate an amplitude modulator in order to alter an amplitude of at least one EM wave supplied to the energy application zone. In some embodiments, the source of EM energy may be configured to supply EM energy in a plurality of amplitudes, and the processor may be configured to cause the application of energy at a subset of the plurality of amplitudes. In some embodiments, the apparatus may be configured to supply EM energy through a plurality of radiating elements, and the processor may be configured to supply energy with differing amplitudes simultaneously to at least two radiating elements.

Although FIG. 3A and FIGS. 2A and 2B illustrate circuits including two radiating elements (e.g., antennas 16, 18; 210, 220; or radiating elements 2018), it should be noted that any number of radiating elements may be employed, and the circuit may select combinations of MSEs through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. In some embodiments amplitude may be held constant and field changes may be caused by switching between radiating elements and/or subsets of radiating elements. Further, radiating elements may include a device that causes their location or orientation to change, thereby causing field pattern changes. The combinations are virtually limitless, and the invention is not limited to any particular combination, but rather reflects the notion that field patterns may be altered by altering one or more MSEs.

Some or all of the forgoing functions and control schemes, as well as additional functions and control schemes, may be carried out, by way of example, using structures such as the EM energy application subsystems schematically depicted in FIG. 1 or FIG. 3A.

Figure 3B:
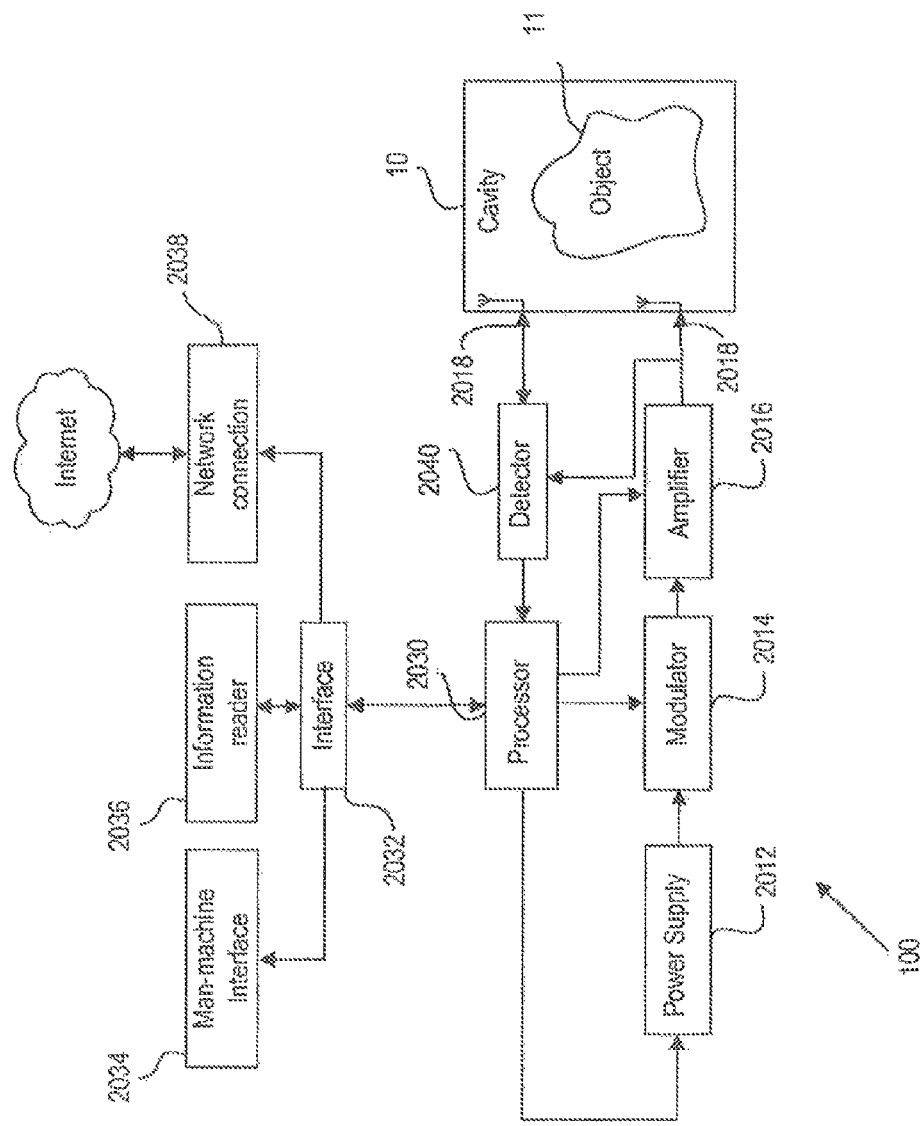
FIG. 3B is a diagrammatic representation of an apparatus for applying EM energy to an object, in accordance with some exemplary embodiments of the present invention.

To facilitate information transfer to and from processor 2030, some embodiments may include an interface 2032, as shown in FIG. 3B. Interface 2032 may provide a conduit for information transfer to and from processor 2030 and may include any circuitry, components, or devices suitable for transferring signals between processor 2030 and one or more information sources. In some embodiments, interface 2032 may include a data bus for carrying signals to and from processor 2030.

The information sources in communication with processor 2030 via interface 2032 may include any suitable devices for providing signals to processor 2030. In some embodiments, interface 2032 may be configured to transfer signals to or receive signals from a man-machine interface 2034. The signals may carry data. Man-machine interface 2034 may include any suitable type of input device for receiving input from a user of apparatus 100. In some embodiments, man-machine interface 2034 may include a graphical user interface (GUI). Alternatively, or additionally, man-machine interface 2034 may include any combination of a plurality of buttons, a touch screen, microphone, pointer device, etc. useful for inputting information. Through man-machine interface 2034, a user may input one or more values associated with object 11 or with a desired procedure for processing object 11. For example, using man-machine interface 2034, the user may provide an energy application schedule and/or any input parameter values associated thereof, by which energy may be applied to energy application zone 9 and/or object 11. Interface 2032 may also be configured to transfer signals to or receive signals from a network connection 2038. Network connection 2038 may be used to connect apparatus 100 with one or more sources of information located external to apparatus 100. For example, network connection 2038 may provide a communication path to one or more remotely located computers, to the Internet, to an externally located database, etc. In some embodiments, network connection 2038 may enable one or more remotely located users or devices to input parameter values, run programs, select energy application schedules, and/or enter commands for operation of apparatus 100. The connection between interface 2032 and network connection 2038 may be established using any appropriate communication hardware and communication protocols. For example, in some embodiments, network connection 2038 may include a router and/or other appropriate hardware, and interface 2032 and network connection 2038 may be in communication across either a wired or wireless connection.

Interface 2032 may also be configured to communicate with one or more information readers 2036, which, in turn, may be adapted to read or receive information associated with a machine readable element. For example, in some embodiments, the machine readable element may include one or more of an RFID tag, a barcode, optical images or indicia, and/or combinations thereof. In certain embodiments, the machine readable element may be attached, affixed, or otherwise associated with object 11 or its packaging. The machine readable element may include encoded information relating to object 11 and/or relating to a procedure for processing object 11. For example, information stored on the machine readable element may include, e.g., a material type indicator, a weight associated with object 11, an energy application schedule related to object 11 and/or any input parameter values associated thereof, a total amount of energy to be absorbed in object 11, a total amount of energy to be supplied to the radiating element(s) and/or any desired characteristic of object 11 to be achieved through processing with EM energy. In some embodiments, a user may manually operate information reader 2036 and scan a selected machine readable element corresponding to a desired procedure for processing object 11. Further still, processor 2030 may be configured to control information reader 2036 in such a manner that an appropriate machine readable element is automatically selected for reading based, for example, on user input provided through man machine interface 2034.

As indicated, processor 2030 may be configured to regulate the source of EM energy in order to control how EM energy is applied to energy application zone 9, for example, using which energy application schedule or power supply protocol.

Figure 4:
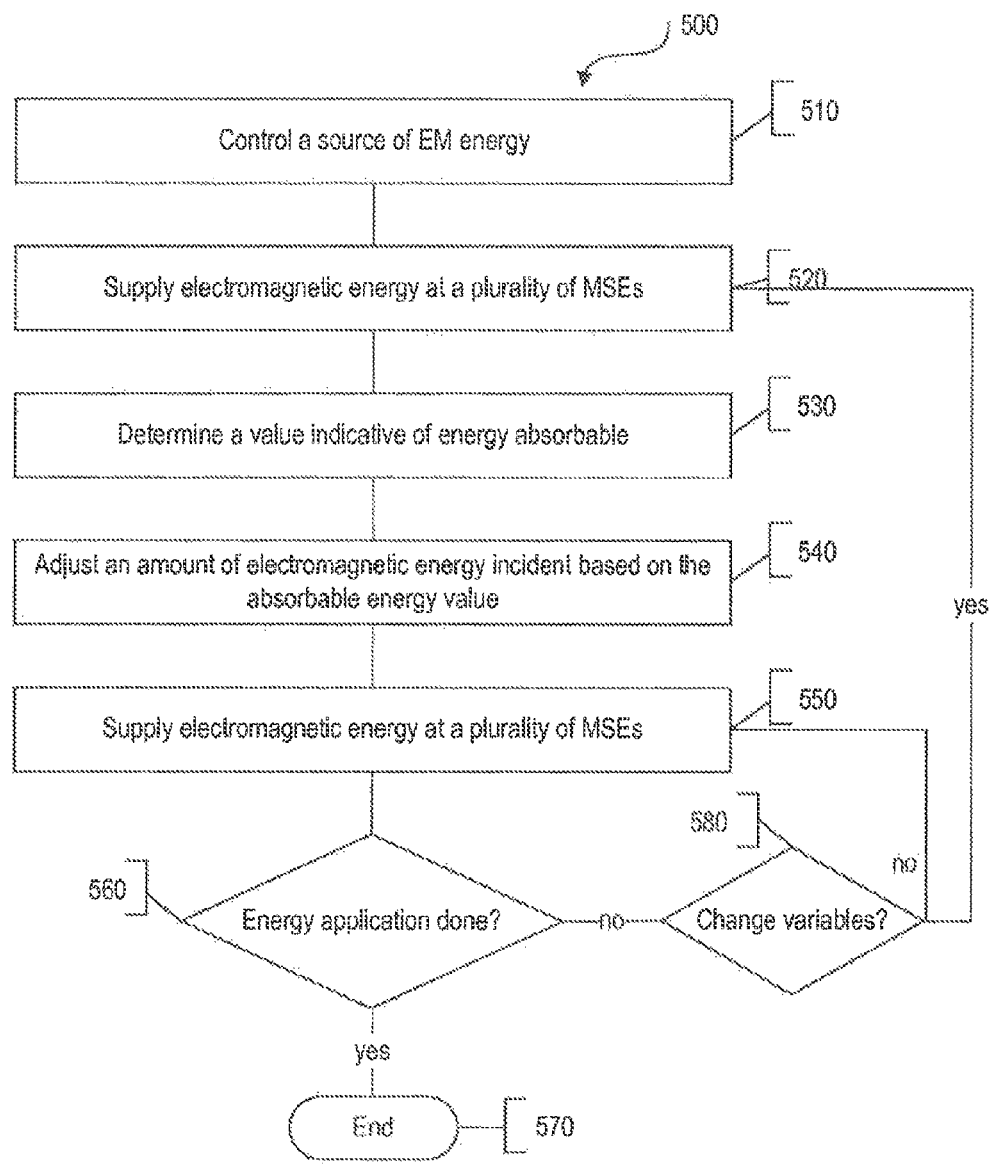
FIG. 4 is a flow chart of a method for applying EM energy to an energy application zone in accordance with some embodiments of the present invention.

FIG. 4 represents a method for applying EM energy to an object in accordance with some embodiments of the present invention. EM energy may be applied to an object, for example, through at least one processor implementing a series of steps of method 500 of FIG. 4.

In certain embodiments, method 500 may involve controlling a source of EM energy (step 510). By way of example only, in step 510, the at least one processor may be configured to control EM energy application subsystem 96 or power supply 2012.

The source may be controlled to supply EM energy at a plurality of MSEs (e.g., at a plurality of frequencies, phases, amplitudes etc.) to at least one radiating element, as indicated in step 520. Alternatively or additionally, the source may be controlled to supply the EM energy to the at least one radiating element at a plurality of phases and/or at a plurality of other parameters that may change the field pattern excited in the cavity, that are generally referred herein as modulation space elements (MSEs).

Various examples of MSE supply, including sweeping, may be implemented in step 520. Alternatively or additionally, other schemes for controlling the source may be implemented so long as that scheme results in the supply of energy at a plurality of MSEs (for example: sequentially or simultaneously). The at least one processor may regulate subsystem 96 to supply energy at multiple MSEs to at least one transmitting radiating element (e.g., antenna 102).

In certain embodiments, the method may further involve a step 530 of calculating or otherwise determining a value indicative of energy absorbable by the object. The determining may be at each of the plurality of MSEs supplied in step 520. An absorbable energy value may include any indicator—whether calculated, measured, derived, estimated or selected—of an object's capacity to absorb energy. For example, computing subsystem 92 may be configured to determine an absorbable energy value, such as a dissipation ratio associated with each MSE. Processor 2030 may determine a value indicative of energy absorbable by the object (e.g., DR) based on feedback signals received from detector 2040. The absorbable energy values may be determined during a scan stage (to be further used in a heating stage).

In certain embodiments, the method may also involve adjusting an amount of EM energy incident at each of the plurality of MSEs based on the absorbable energy value at each MSE (step 540). For example, in step 540, the processor may determine an amount of energy to be applied at each MSE (e.g., during the heating stage), as a function of the absorbable energy value associated with that MSE.

In some embodiments, a choice may be made not to use all possible MSEs. For example, a choice may be made not to use all possible frequencies in a working band, such that the emitted frequencies are limited to a sub band of frequencies, for example, where the Q factor in that sub band is smaller or higher than a threshold. Such a sub band may be, for example 50 MHz wide 100 MHz wide, 150 MHz wide, or even 200 MHz wide or more.

In some embodiments, the processor may determine a weight, e.g., power level, used for supplying the determined amount of energy at each MSE, as a function of the absorbable energy value. For example, amplification ratio of amplifier 2016 may be changed inversely with the energy absorption characteristic of object 11 at each MSE. In some embodiments, when the amplification ratio is changed (e.g. inversely with the energy absorption characteristic), energy may be supplied for a constant amount of time at each MSE. Alternatively or additionally, the at least one processor may determine varying durations at which the energy is supplied at each MSE. For example, the duration and power may vary from one MSE to another, such that their product correlates (e.g., inversely) with the absorption characteristics of the object. In some embodiments, the controller may use the maximum available power at each MSE, which may vary between MSEs. In some embodiments, the controller may use the same power level at each MSE. This variation may be taken into account when determining the respective durations at which the energy is supplied at maximum power at each MSE. In some embodiments, the at least one processor and/or controller (e.g., controller 101) may determine both the power level and time duration for supplying the energy at each MSE.

In certain embodiments, the method may also involve supplying EM energy at a plurality of MSEs to the radiating elements (step 550) (for example, at the amounts of energy determined in step 540. Step 550 may be referred to as the heating stage. Respective weights are optionally assigned to each of the MSEs to be transmitted (step 540) for example based on the absorbable energy value (as discussed above). EM energy may be applied to cavity 10 via radiating elements, e.g., antenna 102, 16, 18 or 2018.

Energy application may be interrupted periodically (e.g., several times a second) for a short time (e.g., only a few milliseconds or tens of milliseconds). Once energy application is interrupted, in step 560, it may be determined if the energy transfer should be terminated. Energy application termination criteria may vary depending on application. For example, for a heating application, termination criteria may be based on time, temperature, total energy absorbed, or any other indicator that the process at issue is compete. For example, heating may be terminated when the temperature of object 11 rises to a selected temperature threshold. In another example, in thawing application, termination criteria may be any indication that the entire object is thawed.

If in step 560, it is determined that energy transfer should be terminated (step 560: yes), energy transfer may end in step 570. If the criterion or criteria for termination is not met (step 560: no), it may be determined if variables should be changed and reset in step 580. If not (step 580: no), the process may return to step 550 to continue transmission of EM energy. Otherwise (step 580: yes), the process may return to step 520 to determine new variables. For example, after a time has lapsed, the object properties may have changed; which may or may not be related to the EM energy transmission. Such changes may include temperature change, translation of the object (e.g., if placed on a moving conveyor belt or on a rotating plate), change in shape (e.g., mixing, melting or deformation for any reason) or volume change (e.g., shrinkage or puffing) or water content change (e.g., drying), flow rate, change in phase of matter, chemical modification, etc. Therefore, at times and in response, it may be desirable to change the variables of transmission. The new variables that may be determined may include: a new set of MSEs (e.g., frequencies), an amount of EM energy incident or delivered at each of the plurality of MSEs, weight, e.g., power level, of the MSE(s) and duration at which the energy is supplied at each MSE. Consistent with some of the presently disclosed embodiments, less MSEs may be swept in step 520 performed during the energy application phase than those swept in step 520 performed before the energy application phase, such that the energy application process is interrupted for a minimum amount of time.

In some embodiments, steps 510-550 may be repeated plurality of times while processing the object—for example: until a stop signal is received, e.g., from a user interface.

An aspect of some embodiments of the invention may relate to determining an energy application schedule, and applying RF energy according to the determined schedule.

An energy application schedule may include, for example, timing instructions for applying energy at a plurality of energy application events. Each energy application event may include energy application at a single MSE. In some embodiments, an energy application event may also include intermissions in energy application, for example, when an energy application event includes energy application in a duty cycle of less than 100%, for instance, when an energy application event includes pulsed application of energy. In some embodiments, two or more energy application events, sequential or not, may include energy application at the same MSE.

The timing included in an energy application schedule may be relative, for example, timing of one event with respect to another. For example, in some embodiments, the timing instructions may include an ordering of energy application events. Additionally, or alternatively, an energy application schedule may include intermissions or pauses between energy application events.

An energy application event may be characterized by and/or relate to an MSE. The MSE may include values of controllable variables that may affect field distribution excited in the energy application zone, for example, which radiating elements are to be activated during the energy application event, at what frequency or frequencies, at what phase difference between them, a position and/or orientation of each radiating element, position and/or orientation of other conductive elements that may be controlled to modify the field pattern in the energy application zone, current, voltage, or other electrical parameters that may be applied to devices that might affect the field pattern in the energy application zone (e.g., current flowing in a coil adjacent a ferrite element), or values of any other parameters, which together define a modulation space element in the apparatus.

An energy application event may also be characterized by and/or associated with a power supply protocol. A power supply protocol may include, for example, instruction as to how much power is to be supplied to each of the radiating elements during the energy application event and/or instructions as to how long should the energy application event take. In some embodiments, a power supply protocol may include instructions to vary amounts of power supplied to one or more of the radiating elements during the energy application event. Power supply protocols are discussed in more detail in U.S. Provisional Patent Application No. 61/595,399 entitled "RF Heating at Selected Power Supply Protocols," filed Feb. 6, 2012, and in U.S. Nonprovisional Patent Application entitled "RF Heating at Selected Power Supply Protocols," filed Feb. 5, 2013, both of which are fully incorporated herein by reference.

An energy application schedule may also include intermissions between energy application events. The intermissions may be periods at which little or no energy is applied. The energy application schedule may determine the length of such intermissions, and between which energy application events the intermissions should appear.

Table 1, below, is an illustration of an exemplary energy application schedule. The left column includes serial numbers of the energy application events. According to the energy application schedule exemplified in Table 1, energy may be applied first at event #1, then at event #2, and so on. The middle column in Table 1 includes the MSEs, at which energy may be applied for each event. In the Table, the exemplary MSEs are shown as one-dimensional, and include frequency only. However, this is merely exemplary and the MSEs may be multi dimensional. The power supply protocol characterizing each energy application event in the energy application schedule illustrated in Table 1 may be a default protocol, common to all energy application events, and therefore need not be specified in the energy application schedule. In some embodiments, different power supply protocols may be selected for different energy application events, and a tabloid representation of an energy application schedule may include a column specifying the power supply protocol selected for each event.

in the right column in Table 1, intermissions that may be applied after each energy application event are provided. For example, an intermission of 5 milliseconds is indicated, by the schedule depicted in Table 1, between energy application events #1 and #2. A minimal intermission and/or an intermission of zero time duration (e.g. between event 4 and event 5 in Table 1) may mean that energy application may cease only for a duration in a transition between MSEs. As used herein "intermission" is meant to refer to a deliberate cessation of energy application and it is to be understood that there may be additional delays in energy application arising from causes other than deliberate cessation of energy application (e.g., delays due to transition from one MSE to another, delays inherent in energy-application related hardware, energy application-related devices or other devices used in the application of energy). Energy application arranged in events with intermissions of zero time duration between them may be referred to as "continuous energy application." Energy application arranged in events in which some transitions have intermissions of zero time duration between them and some do not may be referred to as "nearly continuous energy application." In general, the intermissions making part of energy application schedules may be added to such hardware-required intermissions.

TABLE 1

| # | MSE [MHz] | Intermission [ms] |
|---|-----------|-------------------|
| 1 | 800.0     | 5                 |
| 2 | 800.5     | 1                 |
| 3 | 801.0     | 0.5               |
| 4 | 801.5     | 0                 |
| 5 | 802.0     | 0.1               |
| 6 | 802.5     | 0                 |

The order of MSEs at which energy may be applied according to an energy application schedule may be regular or irregular along each dimension of the modulation space. Exemplary ways of classifying orders by regularity are discussed below. As will be apparent from the following discussion, the order depicted in Table 1 may be classified as regular, An order of MSEs may be regular or irregular along any dimension in the modulation space. For example, MSEs that are elements of a modulation space having two dimensions (e,g, frequency and phase) may be ordered regularly or irregularly along each dimension of the MS. For example, MSEs including frequency values and phase values may be ordered regularly or irregularly along the frequency dimension, along the phase dimension, or along both. A variable that is a dimension of the modulation space, (e.g., frequency) may be referred to herein as a modulation space variable, or, in short, MS variable.

Table 2 depicts an energy application schedule, wherein an order of MSEs is regular along one modulation space variable and irregular along another. For example, the MSE order depicted in Table 2 is irregular along the frequency dimension and regular along the phase dimension.

Intermissions, although possibly included in the energy application schedule depicted in Table 2, are not shown, because they may be ignored for determination of regularity or irregularity of the order.

TABLE 2

| # | Frequency [MHz] | Phase [degrees] |
|---|-----------------|-----------------|
| 1 | 800             | 0               |
| 2 | 810             | 120             |
| 3 | 801             | 240             |
| 4 | 811             | 0               |
| 5 | 802             | 120             |
| 6 | 812             | 240             | in Table 2, the order of the phases may be described to include cycles of increasing phase, each cycle including three phases: 0, 120, and 240 degrees. The order of the frequencies in Table 2 may be described to include cycles of increasing frequency, each cycle including two frequencies: in the first cycle: 800 and 810 MHz, in the second cycle 801 and 811 MHz, and in the third cycle 802 and 812 MHz.

Generally, energy application in any order of frequencies may include energy application in cycles of increasing (or decreasing) frequency values. The same is true for any other MS variable. A change of course from increase to decrease may occur when going from one cycle to another. For example, according to the energy application schedule exemplified in Table 2, energy may be applied at cycles of two frequencies and at cycles of three phases. A cycle may be characterized by a single direction of change from the value of an MS variable in one energy application event to the value of the same MS variable in a succeeding energy application event: either increase or decrease. Two energy application events, in which a value of an MS variable does not change, may be considered a single energy application event for purposes of determination of the regularity of energy application order along that MS variable. The application of this idea is discussed below in the context of Table 4.

A change from increase to decrease or from decrease to increase may indicate the beginning of a new cycle. Such a change may be referred to herein as a change of course or course change. Course changes may be identified in Table 2, for example, between the second and third energy application events along the frequency column, and between the third and fourth energy application events along the phase column.

For example, an order of frequency values may be considered regular if the number of cycles (Nc) is about equal to the ratio between the number of energy application events (Nevents) and the number of different frequency values included in the energy application schedule (Nvalues). The same may be true for an order of phase values, or for an order of any other MS variable. Thus, generally, in a regular order, Nc=Nevents/Nvalues.

For example, in the energy application schedule depicted in Table 2, along the phase column, Nc=2; Nvalues=3; and Nevents=6, and therefore, Nc=Nevents/Nvalues, which may be a criterion for classifying an order as regular.

An order may be considered irregular if, for given numbers of energy application events and MS variable values, the number of cycles (Nc) is larger than in a regular order. In other words, in an irregular order, the number of cycles is greater than the ratio between the number of energy application events and the number of different values, and Nc>Nevents/Nvalues.

For example, in Table 2, along the frequency column, Nc=3; Nvalues=6; and Nevents=6. Since, in the energy application schedule depicted in Table 2, Nc>Nevents/Nvalues (because 3>6/6) the order of frequencies in this schedule may be considered irregular. It is noted that for the purpose of determining regularity of an order, each energy application event may be associated with only one cycle.

The number of values in each cycle along a given MS variable need not be the same for all the cycles. For example, Table 3 depicts an irregular energy application schedule with cycles of differing lengths.

TABLE 3

| # | Frequency [MHz] |
|---|---|
| 1 | 2400 |
| 2 | 2410 |
| 3 | 2400 |
| 4 | 2420 |
| 5 | 2430 |
| 6 | 2402 |
| 7 | 2412 |

TABLE 3-continued

| # | Frequency [MHz] |
|---|---|
| 8 | 2403 |
| 9 | 2404 |
| 10 | 2405 |
| 11 | 2406 |
| 12 | 2407 |

The energy application schedule depicted in Table 3 includes four energy application cycles, the first of which includes energy application events 1 and 2; the second—events 3, 4, and 5; the third—events 6 and 7; and the fourth includes events 8, 9, 10, 11, and 12. Since Nc=4, Nevent=12, and Nvalues=11, and 4 is larger than 12/11, the order depicted in Table 3 is irregular.

As discussed above, the number of energy application cycles in an irregular energy application order may be larger than in a regular order. For example the number of cycles may be 2Nevents/Nvalues, 3Nevents/Nvalues, 10Nevents/Nvalues, or larger or intermediate number. The coefficient 2, 3, 10, etc. may be referred to as "hopping level," denoted by H. For example, if energy is applied at 100 different frequencies, and a series of 1000 consecutive energy application events includes more than 10 cycles (e.g., 15 cycles), the energy application order may be considered irregular and the hopping level H=15.

The hopping level, denoted with H, may be defined by the equation H=Nc·Nvalue/Nevents. According to some embodiments of the invention, an energy application schedule may include instructions to apply energy at an irregular order, having a hopping level larger than 1 (e.g., 1.5, 2, 3, 10, etc.) For example, the hopping level in Table 3 is 4.11/12=44/12=3.667.

Applying energy at an irregular order along an MS variable may include applying energy at first and second values of the MS variable, and subsequently applying energy at a value higher than the first and lower than the second before applying energy again at one of the first and second values.

For example, applying energy at an irregular order of frequencies may include applying energy at a first frequency, then applying energy at a second frequency, higher than the first, and then applying energy at a third frequency, lower than the second but higher than the first, before applying energy again at the first or at the second frequency. The first, second, and/or third frequencies may be applied at non-consecutive energy application events, for example, at events number 10, 50, and 100.

In another example, applying energy at an irregular order of frequencies may include applying energy at a first frequency, then applying energy at a second frequency, lower than the first, and then applying energy at a third frequency, lower than the first but higher than the second.

Table 4 depicts an energy application schedule, wherein energy is applied at MSEs as written in the usual course of English writing (i.e., from left to right and from top to bottom). Thus, the phases are applied in 5 cycles, each cycle written in one of the rows. Regularity along the phase dimension is easily verified, since $H_{phase}=5\cdot4/20=1$.

For purpose of determining the regularity along the frequency dimension of the MS, it may be useful to consider all the consecutive events at which the frequency remains unchanged as a single energy application event. Thus, each raw in Table 4 depicts a single energy application event and the schedule includes two frequency cycles: one depicted in the first three rows, and one depicted in the last two rows.

The hopping value along the frequency dimension may be determined then to be $H_{frequency}=2*5/4=2.5$.

TABLE 4

| | | | |
|---|---|---|---|
| (2400, 0°) | (2400, 90°) | (2400, 180°) | (2400 270°) |
| (2410, 0°) | (2410, 90°) | (2410, 180°) | (2410 270°) |
| (2420, 0°) | (2420, 90°) | (2420, 180°) | (2420 270°) |
| (2401, 0°) | (2401, 90°) | (2401, 180°) | (2401 270°) |
| (2411, 0°) | (2411, 90°) | (2411, 180°) | (2411 270°) |

Additionally or alternatively to determining the order of energy application events, an energy application schedule may include intermissions between energy application events. An intermission may be a time period starting at the end of one energy application event and ending at the beginning of a succeeding energy application event. An intermission may be a period of no energy application.

Intermissions may be characterized by the time they start and/or by their duration. For example, in Table 1 above, the starting time of each intermission may be defined as the ending time of the preceding energy application event, and the duration of each intermission is given in the right column.

In some embodiments, an energy application schedule may include instructions to intermit energy application at certain predetermined times, for example, each 30 seconds from the commencement of energy application (whether these 30 seconds include intermissions or not). As used herein, if an aspect of energy application is "predetermined," it is at least one of selected, chosen or determined prior to energy application. The verb "intermit" is used herein in the sense of stop temporarily, pause for a short period of time.

In some embodiments, an energy application schedule may include instructions to apply energy intermittently upon occurrence of a predetermined occasion.

In one example, a predetermined occasion, which may be followed by an energy application intermission, may include a continuous or partially continuous supply of a predetermined amount of RF energy to the radiating elements. Continuous supply may mean supply with no intermission. Examples of amounts of supplied EM energy may include, for example, 0.5 kJ, 1 kJ, or any smaller, larger, or intermediate amount of RF energy.

In some embodiments, the predetermined occasion may include continuous or partially continuous supply of a predetermined amount of energy at a single MSE. In some embodiments, the predetermined occasion may include continuous supply of a predetermined amount of energy at a group of MSEs. MSE grouping is discussed below.

In another example, the predetermined occasion may be a continuous absorption of a predetermined amount of RF energy by the object. Continuous absorption may mean absorption of energy during two or more energy application events that are not separated by an intermission. The amount of energy absorbed at an MSE may be estimated by multiplying the amount of energy supplied to the radiating elements by an absorbability indicator, which may be any value indicative of energy absorbable in the load.

In some embodiments, the predetermined occasion may include continuous absorption of a predetermined amount of energy by the object at a single MSE. In some embodiments, the predetermined occasion may include continuous absorption of a predetermined amount of energy at a group of MSEs.

In some embodiments, an energy application schedule may dictate an energy application intermission after energy is continuously applied for more than a predetermined period (e.g., 5 ms). In some embodiments, an energy application schedule may dictate an energy application intermission after energy is continuously applied for more than a predetermined period at a single MSE or at a predetermined group of MSEs.

In some embodiments, an energy application schedule may be based on MSE grouping. For example, an intermission may be set when continuous energy application to MSEs belonging to a single group exceeds some predetermined threshold. In another example, energy application order may be set such that the number, duration, or other characteristic of consecutive energy application events at the same group of MSEs is below some predetermined threshold.

In some embodiments, an energy application order may include energy application at an MSE of a first group, then at MSEs of one or more second groups, and only then at another MSE of the first group. In these and other embodiments, there may be a maximum number of MSEs applied from the first group before applying MSEs from the second (or other groups). In some embodiments, the first number may be 10 or less, e.g., 5 or less, or 2. The maximum number may be one, in some embodiments. In some embodiments, energy may be applied at one MSE from each of two or more groups before returning to applying energy at another MSE of the first group. In some embodiments, the schedule may further determine an order within a group. For example, in one group energy may be applied at MSEs of a first order (e.g., from lower to higher frequency), and in another—in another order (for example, in an irregular order). In some embodiments, MSEs may be grouped to three or more groups.

In some embodiments, MSEs may be grouped together according to frequency values, phase values, and/ or values of other MS variables. For example, one group may include all MSEs having frequency values of between 800 MHz and 810 MHz, and another group may include all MSEs having frequency values of between 810 MHz and 820 MHz. In another example, MSEs are grouped such that all MSEs having the same phase value are grouped together. For example, one group may contain only MSEs having phase values of 30 degrees, another group may contain only MSEs having phase values of 120 degrees, etc. In some embodiments, MSEs may be grouped according to the values of two or more of the MS dimensions, for example, one group may contain MSEs having frequency values in a first frequency range and phase values in a first phase-range, and another group may contain MSEs having frequency values of the first frequency range, and phase values of a second phase range.

Figure 5:
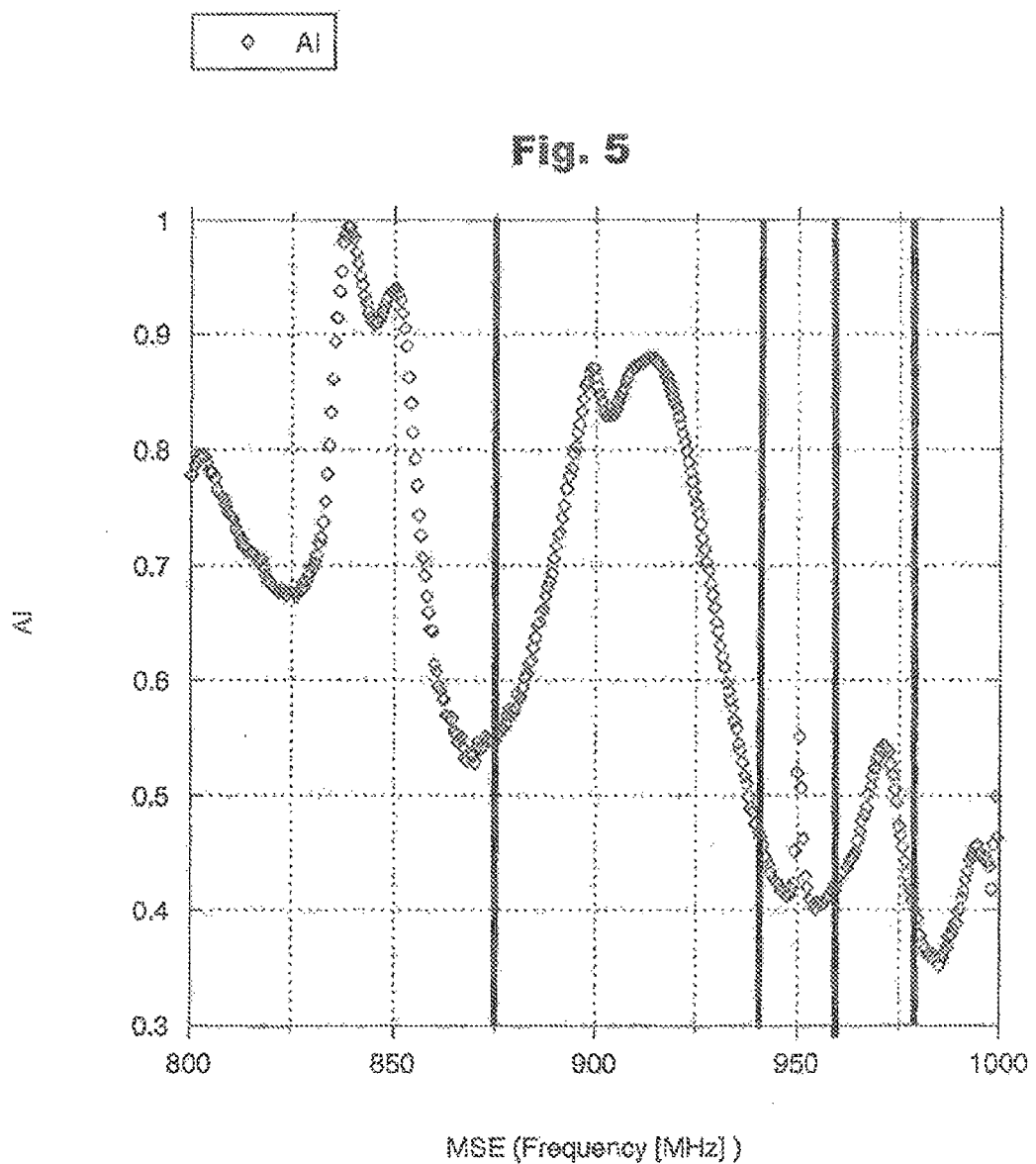
FIG. 5 is a graphical presentation of AI measurement results obtained from a pizza.

In some embodiments, MSEs may be grouped according to absorbability indicators (referred to herein as "AI") associated with the various MSEs. For example, the MSEs may be grouped according to values of AI, e.g., in a first group, MSEs having AI smaller than 0.2, in a second group, MSEs having AI larger than 0.8, and all the other MSEs in a third group. In another example, MSEs may be grouped according to their association with AI peaks. For example, FIG. 5 shows AI measurement results obtained from a pizza heated by EM energy after 11 minutes of heating (first five minutes for thawing, and the rest for cooking). Heating by EM energy included energy application at a plurality of frequencies at a bandwidth of 800-1000 MHz. Based on these measurement results, frequencies may be grouped according to AI peaks they may be associated with (e.g., such that each group includes at least one peak). For example, in the case shown in FIG. 5, a first group may include the frequencies between 800 and 875 MHz, a second group may include the frequencies between 875 and 940 MHz, the third group may include frequencies between 940 and 960 MHz, the fourth may include frequencies between 960 and 980 MHz, and the fifth and last group may include frequencies between 980 and 1000 MHz, all as depicted by the thick vertical lines in FIG. 5. In some embodiments, the frequency range between 800 and 960 MHz may be divided into two groups, separating between the two peaks included in this frequency range, for example. Since peaks may change during RF application process, so may the grouping. Changing the grouping, or, more generally, the energy application schedule, may happen also under other circumstances. For example, the schedule may be changed by a user, and/or the processor may determine differing schedules during differing sweeps, and in other cases.

In some embodiments, an energy application schedule may include a duration of one or more of the intermissions. For example, an energy application schedule may include intermissions, ail having the same time duration. In another example, the energy application schedule may include intermissions of different time durations.

In some embodiments, a portion of the intermissions (e.g., 10%, 50%, or all of the intermissions) may be shorter than 1 second, optionally, shorter than 0.1 seconds.

In some embodiments, a portion of the intermissions may be proportional to the time duration of a typical energy application event. The proportion coefficient may be, for example, 0.1, 10, or any intermediate value. In some embodiments, the time duration of an energy application event may be the average, median, or mode, of time durations of the energy application events in an energy application schedule.

In some embodiments, an intermission may be a fraction, for example 10% or less of a time it takes heat to diffuse 1 cm in the object. For example, heat diffusion in metal is generally of about 1 cm per minute, and an intermission between energy application events at two sequentially applied MSEs may be 6 seconds or less (e.g., one second or less, a ⅒ of a second, a 1/100 of a second, or intermediate durations, for example, 5/100 of a second). Without being bound by theory, it is suggested that such short intermissions may allow heat to diffuse from hot centers, where RF energy tends to concentrate, to less hot nearby surroundings, and therefore may reduce thermal runaways. A thermal runaway may occur when a hot center changes its dielectric properties such that more and more of the RF energy concentrates at the center. It is suggested that short intermissions in energy application may allow the hot centers to change their dielectric properties more moderately or slowly, and this way limit thermal runaways. Thus, even if heat does not diffuse a considerable distance during the intermission (e.g., in comparison to a wavelength of the RF), the intermission may help in reducing thermal runaways and increasing heating uniformity.

In some embodiments, some energy application schedules may be available to the processor, and the processor may select between them. Selection may be, for example, based on user instructions; provided via a user interface, for example, from a machine readable element, which may be associated with the object or a portion thereof; or may be determined based on feedback from the energy application zone.

The feedback may be EM feedback. EM feedback may be feedback indicative of the EM response of the object, the energy application zone, or both, to the applied EM energy. EM feedback may include power measurements, processed to obtain, for example, absorbability indicators, scattering parameters, and/or input impedances. For example, EM feedback may include any value obtainable from a network analyzer.

Figure 6:
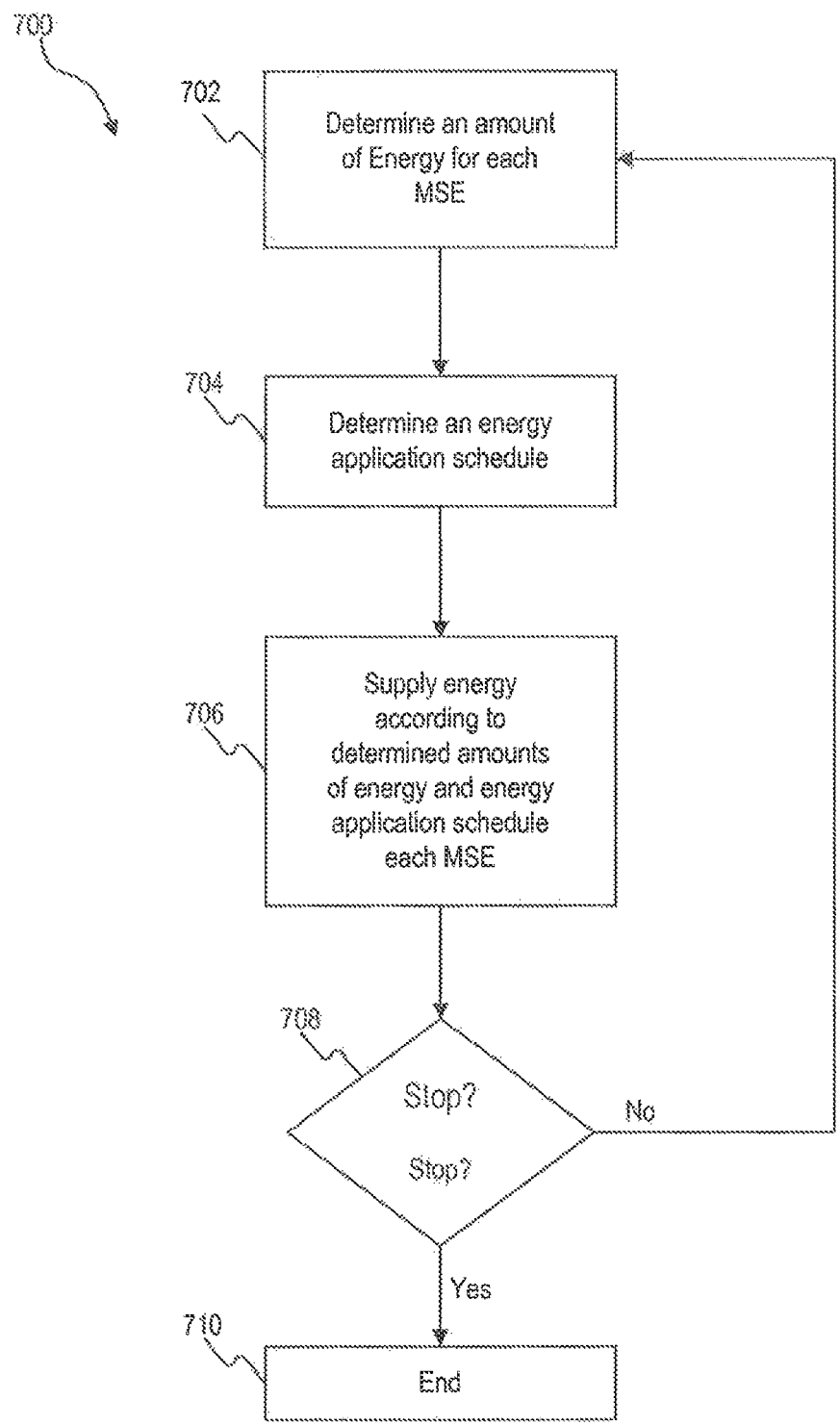
FIG. 6 is a flowchart of a method for applying RF energy according to some embodiments of the invention.

FIG. 6 is a flowchart of a method 700 for applying RF energy according to embodiments of the invention.

In step 702, an amount of energy to be supplied at each of a plurality of MSEs may be determined. In step 704, an energy application schedule may be determined (e.g., based on feedback from the energy application zone or any calculations derived therefrom). In step 706, energy may be supplied according to the amounts of energy determined in step 702 and energy application schedule determined in step 704. In step 708, a stopping criterion may be checked, and if met, energy application may end (710). In some embodiments, a power supply protocol may be selected for each energy application event. In some embodiments (not shown), steps 702, 704, and 706 may repeat several times prior to execution of step 708. In some embodiments, steps 702-706 may be repeated a plurality of times while processing the object—for example: until a stop signal is received, e.g., from a user interface.

If the stopping criterion is not met (step 708: NO), energy may be applied once again. In some embodiments (not shown) the energy may be applied again with the same determined amounts of energy and/or power application schedule. In some embodiments, the amounts of energy may be re-determined before energy application takes place again. Additionally, or alternatively, an energy application schedule may be re-determined before energy application continues. When the stopping criterion is not met, control may return to step 702, and both amounts of energy and energy application schedules may be re-determined.

Determining the amount of energy in step 702 may include reading the amount of energy from a pre-programmed lookup table, receiving the amount of energy via an interface, calculating the amount of energy according to preprogrammed procedures, or in any other manner which allows determining amounts of energy.

In some embodiments, determining the amount of energy may include receiving, (e.g., from one or more detectors), power measurement results pertaining to power detected to be emitted into cavity 10 (or energy application zone 9) by the one or more radiating elements and power detected to exit cavity 10 or zone 9. Determining the amount of energy may further include estimating or determining a value indicative of energy absorbable in the object, (which, for brevity, may be referred to below as an absorbability indicator or, in acronym, AI) and determining, based on this value, an amount of energy. Determining a value indicative of energy absorbable in the object may include calculation based on such power measurements results or other feedback signal(s).

Determining an amount of energy based on an AI may include searching a lookup table, where energies may be associated with AI values, evaluating the value of a mathematical function of AI, and/or evaluating the value of a function of AI and one or more other variables.

In some embodiments, the amount of energy determined may decrease as the AI increases. For example, in some embodiments, the amount of energy E may be determined by evaluating the function $E=E_0/AI$, where $E_0$ may be a pre-programmed value, a value received via an interface, or a value determined in any other manner and AI may be determined from power measurement results as discussed above. In some embodiments, other functions may be used, for example, $E=E_0 e^{-AI/A_0}$, where the value of $A_0$ may be determined in any of the ways that $E_0$ may be determined, as discussed above. Other functions of AI may also be used, for example, linear functions, higher polynomials (of order 2 or greater), trigonometric functions, step-functions, or any other kind of function. It was found that decreasing functions, e.g., function that inversely relate to AI, may be preferred for achieving uniform heating.

In some embodiments, the functions may depend on the value of AI, for example, for some values of AI—one function may be used, and for other values of AI—another function may be used. For example, in some embodiments, frequencies may be classified to on-peak frequencies (at or near which the AI has a local maximum when plotted against the frequency) and off-peak frequencies (away of local maximums in the AI). Another example of a way to distinguish between on-peak and off-peak frequencies, is to identify frequencies characterized by AI values higher than a threshold as on-peak frequencies, and frequencies characterized by AI values below the threshold as off-peak frequencies. Determination of energy at on-peak frequencies may be in accordance with a different function than at off-peak frequencies. For example, they may both be determined using exponential functions, but with different values of $A_0$ and/or of $E_0$. In another example, energies to be applied to non-peak frequencies may be determined using a liner function; and energies to be applied to non-peak frequencies may be determined using a higher polynomial function.

According to some embodiments, there is only a single radiating element, and the determined amount of energy is supplied to that radiating element. In some embodiments, there are two or more radiating elements, and each emits radiation at a different frequency to minimize interactions between them; and the amount of energy supplied to each may be determined independently of the amount of energy supplied to the other. In some embodiments, there are two or more radiating elements; and the amount of energy supplied to each may be determined independently of the amount of energy supplied to the other.

In some embodiments, there are two or more radiating elements that emit at the same frequency, for example, at a given phase difference between them (e.g., 0°, 90°, or any other phase difference value). In these cases, the amounts of energy supplied to one may be determined considering the amount of energy supplied to the other. In some embodiments, the relation between the amounts of energy supplied to each of the two or more radiating elements may be predetermined (for a given MSE), and the determined amount of energy may be distributed between the various radiating elements in accordance with this predetermined relation.

In step 704, one or more energy application schedules may be determined. Determining the energy application schedules in step 704 may include receiving the energy application schedule via an interface, determining the energy application schedule according to preprogrammed procedures, selection of an energy application schedule by a user via a user interface, or in any other manner.

In some embodiments, determining the energy application schedules may be based on absorbability indicator values at one or more of the MSEs. These absorbability indicator values may be obtained, in some embodiments, during determination of the amounts of energy in step 702. In some embodiments, the amounts of energy to be supplied at a plurality of MSEs may be determined before an energy application schedule may be determined or selected.

The determination of an energy application schedule may be, for example, according to a preset energy application schedule preprogrammed to the processor. In another example, the determination of energy application schedule may be based on amounts of energy determined to be applied. For example, in some embodiments, an intermission of a predetermined period may be applied after application of each predetermined amount of energy. For example, a 5 ms intermission may be determined to occur after each 1 kJ of energy is supplied. In another example, an intermission may be determined according to absorbed energies, e.g., a 10 ms (or any other predetermined length) intermission may be determined after each 1 kj of energy is absorbed. Absorbed energy may be estimated as discussed above, as a multiplicative product of supplied energy by absorbability indicator, and may be determined even before commencement of energy application.

In some embodiments, absorbed amounts of energy expected to be absorbed during each energy application event may be obtained before energy application. Then, it may be possible to know in advance at which energy application event the absorbed energy is to meet a given criterion. Thus, energy application intermissions may be determined based on values of energy expected to be absorbed. Alternatively or additionally, intermissions may be determined based on amounts of energy already absorbed.

In some embodiments, the determined energy application schedule may include an order of the MSEs, at which energy is to be applied. Such determination may be, in some embodiments, based on EM feedback from the energy application zone or any calculation thereof, for example, based on Al values. For example, MSEs may be grouped as described above, and an order of the energy application events may be determined such that energy application shifts from one group to another, and the number of consecutive energy application events, in which energy is applied at MSEs that belong to the same group, is limited. For example, the energy application schedule may include an order wherein no two consecutive energy application events include energy application at MSEs that belong to the same group, In some embodiments, the energy application order may be determined independently of EM feedback from the energy application zone, for example, based on instructions provided via a GUI. Additionally or alternatively, intermissions may be determined based on EM feedback and the predetermined order. For example, in some embodiments, the order of MSEs at which energy is to be applied may be predetermined such that consecutively applied MSEs are expected to heat differing portions of the object, or expected to be included in different AI peaks. For example, if AI peaks are known to be of a certain breadth, e.g., 20 MHz or less, the energy application schedule may include applying energy at steps of comparable breadth, for example, 20 or 25 MHz. To ensure that all MSEs are covered, MSEs that were omitted at first, may be applied in a subsequent energy application cycle. This may result in an irregular energy application schedule as described above, for example, in relation to Tables 2 to 4.

In some embodiments, energy application order may be predetermined, for example, preprogrammed. In some embodiments, a preprogrammed order may be adjusted based on EM feedback from the energy application zone.

In step 706, energy may be supplied according to the determined amounts of energy and energy application schedule.

In step 706, power may be supplied to the one or more radiating elements to provide the amount of energy determined in step 702 according to the energy application schedule determined in step 704. In some embodiments, energy may be applied in only a sub-set of the MSEs for which energy was determined. For example, in some embodiments, the energy determined to be supplied at some of the MSEs may be 0 (zero), or below some predetermined limit, and thus, power may be not applied at these MSEs. In some cases, other considerations may be applied not to supply power at an MSE for which power application was determined and/or energy application schedule was determined. These considerations may be, for example, hardware considerations (e.g., if the hardware is incapable of supplying energy at these MSEs), or any other consideration, for example, the wish to omit energy application at frequency bands that have a quality factor above some lower threshold, or an AI above some lower threshold.

In some embodiments, after energy is supplied at all the MSEs in the subset of MSEs at step 706, a stopping criterion may be checked in step 708. For example, the stopping criterion may include a predetermined total amount of energy to be supplied to radiating elements, and if the total amount of energy supplied in practice is smaller than the predetermined amount, the stopping criterion is not met. In another example, the stopping criterion may be a total amount of energy that may be absorbed in the object. In such embodiments, an estimate of the total amount of energy absorbed by the object may be determined (e.g., by multiplying supplied amounts of energy with corresponding values of AI, and summing over all the energy application events that occurred so far in the energy application process), and if smaller than the predetermined amount, the stopping criterion is not met. Other stopping criterions may also be used, and the invention is not limited to any kind of stopping criterion.

If the stopping criterion is met, energy application may stop (710). In other cases, control may return to step 702 and energy application may be continued in accordance with steps 702, 704, and 706 until the stopping criterion is met.

In some embodiments, stopping criterion may be determined based on instructions from outside the apparatus, which may be provided via an interface, for example, via a GUI or via a reader of a data carrier. The data carrier may be, for example, a machine readable element, e.g. a barcode, an RFID, etc.

Each energy application schedule may provide a time distribution of power supply during an energy application event.

According to some embodiments of the invention, there may be provided a method for applying EM energy to an object at a plurality of modulation space elements (MSEs). In the method, energy may be applied at different MSEs according to different energy application protocols. The protocols may be associated with the MSEs according to rules that may change during operation. In some embodiments, at least two rules may be used, and each may be associated with a different subset of the modulation space elements.

In some embodiments, the rules may dictate associating MSEs with energy application protocols based on functions that depend on a parameter, e.g., on a threshold value, and differ from each other by the value of the parameter.

For example, in some embodiments, according to each rule, a first energy application protocol may be associated with MSEs showing AI values below a threshold, and a second energy application protocol may be associated with MSEs showing AI values above the threshold, and the rules may differ from one another by the value of the threshold.

In another example, each rule includes two threshold values, and three different energy application protocols may be associated to MSEs accordingly. For example, a first energy application protocol may be associated with MSEs showing AI values below a first threshold; a second energy application protocol may be associated with MSEs showing AI values above a second threshold, higher than the first; and a third energy application protocol may be associated with MSEs showing AI values above the first threshold and below the second threshold. The rules may differ from one another by the value of the first threshold and/or by the value of the second threshold.

In some embodiments, a plurality of grouping rules may be available, and the method may include selecting among them. In the latter example, the selection may be selecting a pair of threshold values from a plurality of available pairs.

An energy application protocol may be a formula that determines an amount of energy to be applied at an MSE, based on some value associated with the MSE. The value may be derivable from EM feedback received from the energy application zone. For example, the value may be a value indicative of energy absorbable in the object, also referred to herein as absorbability indicator (AI).

Figure 7A:
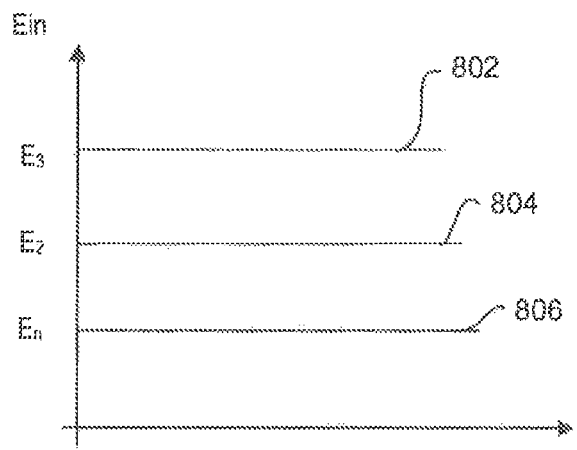
FIG. 7A-7C include graphs illustrating formulas for determining amounts of energy based on values of a parameter, in accordance with some embodiments of the invention.
Figure 7B:
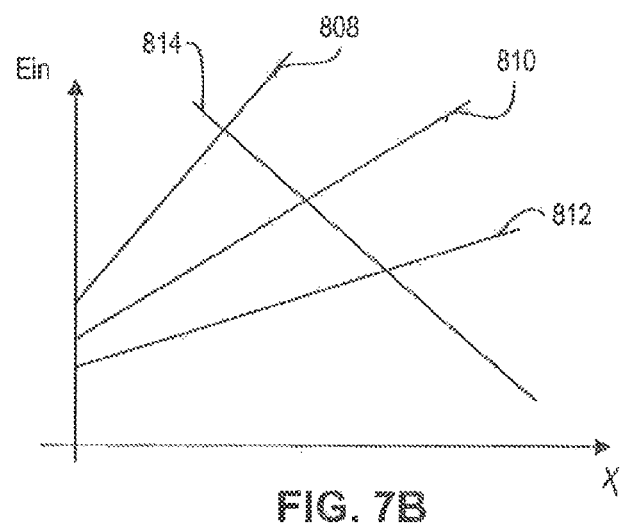
Figure 7C:
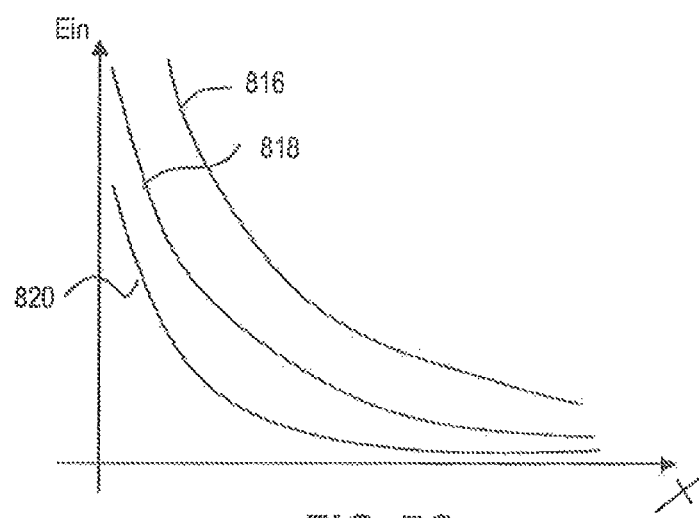

Some exemplary energy application protocols are provided in FIGS. 7A-7C. FIGS. 7A-7C include graphs illustrating formulas for determining amounts of energy based on values of a parameter, in accordance with some embodiments of the invention. Each of the illustrated formulas may be an energy application protocol.

In the graphs of FIGS. 7A-7C the horizontal axis is designated with the generic indicator "X" to indicate that in different protocols the horizontal axis may represent different parameter, (for example, DR, $\Delta\rho$, reflection coefficients or ratios, transmission coefficients or ratios, ratios between one or more coefficients, input impedances, scattering parameters, absolute value of each of the above, phase of each of the above (if applicable), etc.)

In FIG. 7A, three exemplary energy application protocols are graphically presented. The graphs are linear and constant, and dictate application of the same amount of energy at each MSE, regardless of the value of the parameter X. For example, line 802 presents an energy application protocol, according to which an amount of energy equal to $E_3$ is applied at each MSE; line 804 presents an energy application protocol, according to which an amount of energy equal to $E_2$ is applied at each MSE; and line 806 presents an energy application protocol, according to which an amount of energy $E_1$ is applied at each MSE.

In FIG. 7B, four exemplary energy application protocols are graphically presented. The shown graphs are linear. Lines 808, 810, and 812 are all increasing, which means that according to the energy application protocols they represent, more energy is applied to MSEs associated with parameters of higher value. Line 814 exemplifies an energy application protocol, according to which less energy is applied to MSEs associated with an X parameter of larger value.

FIG. 7C shows graphical representations of three energy application protocols, 816, 818, and 820, according to which, the amount of energy to be applied non-linearly decreases as the value of X increases. In some embodiments, line 816, 818, and/or 820 may represent a function having the form $E_0/X$, wherein $E_0$ is some constant amount of energy, to be applied at MSEs, associated with an X value of 1. In some embodiments, the non-linear relationship between applied energy and the value of the parameter X may be different, for example, exponential. For example, energy application protocol as represented by lines 814, 816, 818, and 820 may be used when wishing to apply energy at MSEs inversely related to the absorbable energy value at the corresponding MSE.

In some embodiments, an energy application protocol may define correspondence between values of the X parameter and the amount of energy to be applied, and this correspondence does not follow any simple mathematical form. For example, the values may be determined arbitrarily, randomly, based on experiments, etc.

Figure 8:
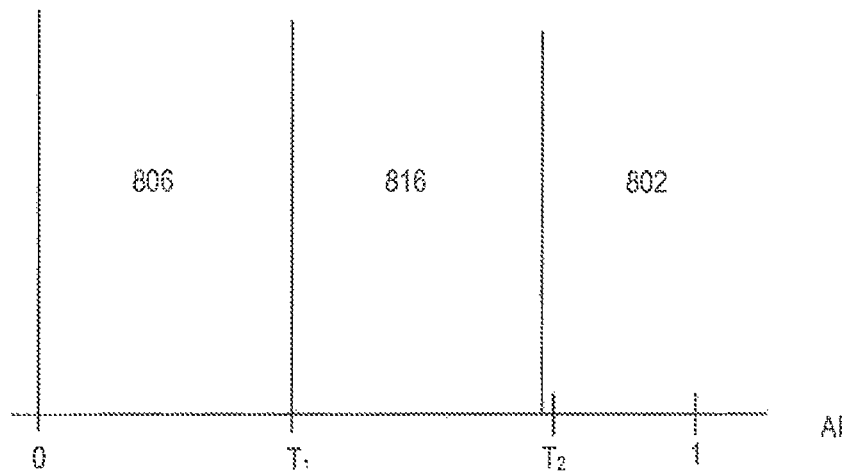
FIG. 8 is a graphical presentation of an exemplary grouping rule, for grouping MSEs.

FIG. 8 is a graphical presentation of an exemplary grouping rule, for grouping MSEs. According to the depicted rule, the parameter that determines the grouping is an absorbability indicator. In other embodiments, this parameter may be any other parameter derivable from EM feedback, as discussed above in relation to parameter X in FIGS. 7A-7C. In some embodiments, the MSEs may be grouped according to one parameter, and the energy application protocol may determine the amount of energy to be applied according to the value of a second parameter, which may be different from the first. In some embodiments, the first and second parameters may be the same.

According to the grouping rule depicted in FIG. 8, at MSEs associated with an absorbability indicator having a value between 0 and a first threshold (T1), energy may be applied according to energy application protocol 806 of FIG. 7A; at MSEs associated with an absorbability indicator having a value between T1 and a second threshold (T2), energy may be applied according to energy application protocol 816 of FIG. 7C; and at MSEs associated with an absorbability indicator having a value between T2 and 1, energy may applied according to energy application protocol 802 of FIG. 7A.

Figure 9:
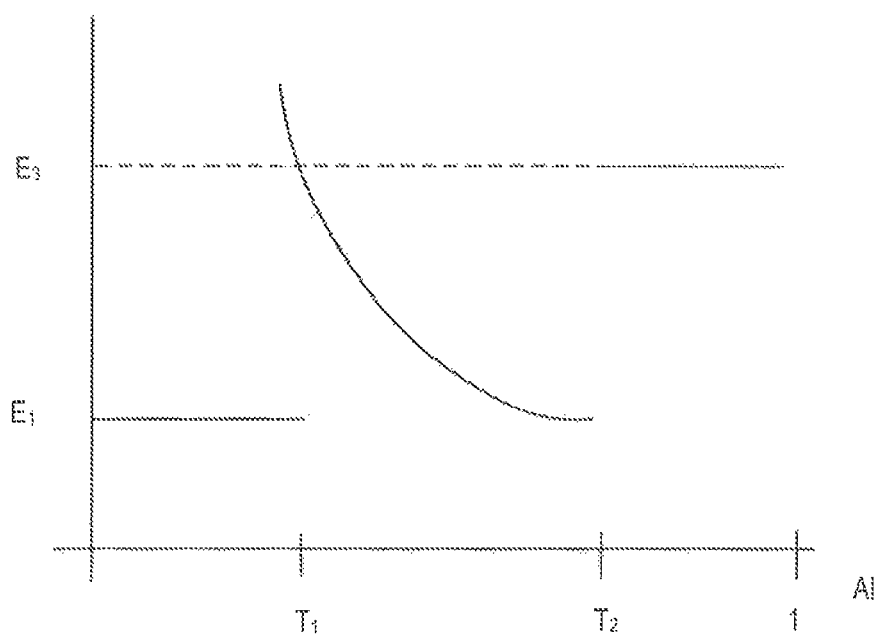
FIG. 9 is a graphical representation of the amounts of energy that may be applied to different MSEs using the rule depicted in FIG. 8 and the energy application protocols depicted in FIGS. 7A and 7C.

FIG. 9 is a graphical representation of the amounts of energy that may be applied to different MSEs using the rule depicted in FIG. 8 and the energy application protocols depicted in FIGS. 7A and 7C.

In practice, in order to determine the amount of energy to be applied at a given MSE, the processor may first select a grouping rule and then group the MSEs according to the rule. The processor may further select an energy application protocol for each group. Once an energy application protocol is selected for an MSE, the amount of energy to be applied at that MSE may be determined based on the energy application protocol. The timing, according to which the determined amounts of energy may be applied at differing energy application events may be determined based on an energy application schedule, and the timing at which power is supplied to each of the radiating elements during an energy application event may be determined according to one or more selected power supply protocols.

In some embodiments, the grouping rule may change during processing. For example, in a first sweep, energy may be applied as depicted in FIG. 9, with T1 and T2 having the values of 0.3 and 0.7, respectively, and in a second sweep, energy may be applied as depicted in FIG. 9, with T1 and T2 having the values of, for example, 0.5 and 1.0, respectively. In some embodiments, the grouping rule may change according to a predetermined sequence. In some embodiments, the grouping rule may change whenever a predetermined event occurs, for example, whenever a predetermined amount of energy is applied since the last rule change, whenever a predetermined amount of time has elapsed since the last rule change, etc. In some embodiments of the invention, there may be two kinds of energy application events: sensory events and processing events. The sensory events may be energy application events, in which the amount of energy applied and/or the power level at which energy is applied are used for gathering the EM feedback. The power level at which energy is applied during sensory events may be small enough not to affect the dielectric properties to be sensed. Processing events may be events, applied in order to process an object, for example by heating. The power level applied during processing events may be much larger than that applied during sensory events. Alternatively or additionally, the power application duration may be much larger during processing events than during sensory events.

In some embodiments, energy application events may be arranged in sweeps: sensory sweeps and processing sweeps. A sensory sweep may be any process that includes consecutive sensory energy application events at multiple MSEs. During a sensory sweep, EM feedback may be collected to base determination of amounts of energy to be applied to each of the multiple MSEs. The determined amounts of energy may be applied during processing energy application events, which may be arranged in a processing sweep. In some embodiments, each two processing sweeps may be separated by one sensory sweep.

In some embodiments of the invention, the order of energy application events in a processing sweep is irregular. In some embodiments, energy application order within a processing sweep may include back-and forth changes along an MSE dimension, which may result in an irregular order. For example, a processing sweep may include energy application at an MSE of a first group (e.g., a sub-band of frequencies), then at MSEs of one or more second groups, and only then at another MSE of the first group. In some embodiments, a processing sweep may include energy application at one MSE from each of two or more groups before energy is applied again at another MSE of the first group. Table 5, below, provides an example of such an order of energy application events.

TABLE 5

| Event No. | Frequency |
|---|---|
| 1 | 800.0 |
| 2 | 810.0 |
| 3 | 820.0 |
| . . . | . . . |
| 11 | 900.0 |
| 12 | 800.5 |
| 13 | 810.5 |
| 14 | 820.5 |
| . . . | . . . |
| 22 | 900.5 |
| 23 | 801.0 |
| 24 | 802.0 |
| 25 | 803.0 |
| . . . | . . . |
| 33 | 901.0 |
| 209 | 809.5 |
| 210 | 819.5 |
| 211 | 829.5 |
| . . . | . . . |
| 219 | 909.5 |

Table 5 describes an order of 219 energy application events in a processing sweep according to an embodiment of the invention. In the embodiments described in Table 5, energy is applied once at each sub-band, and then at other frequencies of the same sub-bands. The first sub-band is between 800 and 809.5, the second—between 810 and 819.5, etc. After energy is applied once at each sub-band (i.e., after energy application events No. 1, 2, 3, . . . 11), energy is applied again in the first sub-band, but in a different frequency (800.5, in event #12, compared to 800.0 in event #1).

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed is:

1. A method of applying electromagnetic (EM) energy to an object at a plurality of modulation space elements (MSEs), the method comprising:
    grouping, with a processor, a number of the plurality of MSEs into at least a first subset and a second subset according to a first grouping rule;
    associating, with the processor, a first EM energy application protocol with the first subset and a second EM energy application protocol with the second subset;
    applying EM energy at MSEs of the first subset according to the first energy application protocol and at MSEs of the second subset according to the second energy application protocol; and after the applying:
    grouping, with the processor, the number of the plurality of MSEs into a third subset and a fourth subset according to a second grouping rule;
    associating, with the processor, a third EM energy application protocol with the third subset and a fourth EM energy application protocol with the fourth subset; and
    applying EM energy at MSEs of the third subset according to the third energy application protocol and at MSEs of the fourth subset according to the fourth energy application protocol.

2. The method of claim 1, further comprising:
    associating each MSE with a value of an absorbability indicator,
    wherein at least one of the grouping rules dictates grouping according to values of the absorbability indicator.

3. The method of claim 1, further comprising:
    associating each MSE with a value of an absorbability indicator,
    wherein the grouping rules include threshold values and dictate grouping according to the values of the absorbability indicator in reference to the threshold values.

4. The method of claim 3, wherein the grouping rules differ from one another in the threshold values.

5. The method of claim 1, wherein the EM energy is radio frequency (RF) energy.

6. An apparatus for applying electromagnetic (EM) energy to a load in a cavity at a plurality of modulation space elements (MSEs), the apparatus comprising:
    at least one processor; and
    a memory including instructions, that when executed by the at least one processor, cause the processor to perform operations including:
    grouping a number of the plurality of MSEs into at least a first subset and a second subset according to a first grouping rule;
    associating a first EM energy application protocol with the first subset and a second EM energy application protocol with the second subset;
    causing a power source to apply EM energy at each of the MSEs grouped into the first subset according to the first EM energy application protocol and at each of the MSEs grouped into the second subset according to the second EM energy application protocol, in response to signals generated by the processor;
    grouping the number of the plurality of MSEs into a third subset and a fourth subset according to a second grouping rule;
    associating a third EM energy application protocol with the third subset and a fourth EM energy application protocol with the fourth subset; and after the EM energy is caused to be applied according to the first and the second energy application protocol,
    causing a power source to apply EM energy at each of the MSEs grouped into the third subset according to the third EM energy application protocol and at each of the MSEs grouped into the fourth subset according to the fourth EM energy application protocol, in response to signals generated by the processor.

7. The apparatus of claim 6, wherein the operations further include associating each of the plurality of MSEs with a value of an absorbability indicator, and at least one of the grouping rules dictates grouping according to values of the absorbability indicator.

8. The apparatus of claim 6, wherein the operations further include associating each of the plurality of MSEs with a value of an absorbability indicator, and wherein the grouping rules include threshold values and dictate grouping according to the values of the absorbability indicator in reference to the threshold values.

9. The apparatus of claim 6, further comprising:
    wherein the operations further include causing application of energy by controlling the source of RF energy.

10. The apparatus of claim 9, further comprising:
    a plurality of antennas configured to receive RF energy from the source of RF energy and apply at least a portion of the RF energy so received to a resonant cavity.

11. The apparatus of claim 6, wherein the apparatus comprises a resonant cavity.

12. The apparatus of claim 6, further comprising:
    a detector configured to supply to the at least one processor with data for determining a value of an absorbability indicator.

13. The apparatus of claim 11, further comprising:
    a detector configured to supply to the at least one processor with data for determining a value for the absorbability indicator.

14. An apparatus for applying electromagnetic (EM) energy to a load at a plurality of modulation space elements (MSEs), the apparatus comprising:

a processor including an electrical circuit; and a memory including instructions, that when executed by the at least one processor, cause the processor to perform operations including:

grouping a number of the plurality of MSEs into at least a first subset and a second subset according to a first grouping rule;

associating a first EM energy application protocol with the first subset and a second EM energy application protocol with the second subset;

generating, with the processor, control signals to control a power source to apply EM energy at each of the MSEs grouped into the first subset according to the first EM energy application protocol and at each of the MSEs grouped into the second subset according to the second EM energy application protocol;

grouping the number of the plurality of MSEs into a third subset and a fourth subset according to a second grouping rule;

associating a third EM energy application protocol with the third subset and a fourth EM energy application protocol with the fourth subset; and after the EM energy is caused to be applied according to the first and the second energy application protocol, generating, with the processor, control signals to control the power source to apply EM energy at each of the MSEs grouped into the third subset according to the third EM energy application protocol and at each of the MSEs grouped into the fourth subset according to the fourth EM energy application protocol.

15. The apparatus of claim 14, wherein the operations further include associating each of the plurality of MSEs with a value of an absorbability indicator, and at least one of the grouping rules dictates grouping according to values of the absorbability indicator.

16. The apparatus of claim 14, wherein the operations further include associating each of the plurality of MSEs with a value of an absorbability indicator, and wherein the grouping rules include threshold values and dictate grouping according to the values of the absorbability indicator in reference to the threshold values.

17. The apparatus of claim 14, further comprising:
wherein the operations further include causing application of energy by controlling the source of RF energy.

18. The apparatus of claim 17, further comprising:
a plurality of antennas configured to receive RF energy from the source of RF energy and apply at least a portion of the RF energy so received to a resonant cavity.

19. The apparatus of claim 14, wherein the apparatus comprises a resonant cavity.

20. The apparatus of claim 14, further comprising:
a detector configured to supply to the at least one processor with data for determining a value of an absorbability indicator.

21. The apparatus of claim 19, further comprising:
a detector configured to supply to the at least one processor with data for determining a value for the absorbability indicator.

* * * * *